United States Patent [19]

Lyon

[11] Patent Number: 5,993,739
[45] Date of Patent: Nov. 30, 1999

[54] CONTINUOUS WASHING SYSTEM

[75] Inventor: Larry R. Lyon, Waukee, Iowa

[73] Assignee: Chaircare, Waukee, Iowa

[21] Appl. No.: 08/960,156

[22] Filed: Oct. 29, 1997

[51] Int. Cl.⁶ .................................................. A61L 9/14
[52] U.S. Cl. .................. 422/31; 422/3; 422/28; 422/105; 422/107; 422/111; 422/292; 422/300; 422/304; 134/72; 134/123; 134/111; 134/108; 134/99.2; 134/18; 134/26; 134/29; 134/32; 134/15; 134/36; 134/37
[58] Field of Search ...................... 422/3, 28, 31, 422/105–111, 292, 297, 300, 304; 134/72, 123, 111, 108, 99.2, 18, 26, 29, 32, 34, 42, 15, 36, 37, 30; 15/63

[56] References Cited

U.S. PATENT DOCUMENTS

| | | | |
|---|---|---|---|
| Re. 34,671 | 7/1994 | Long | 99/386 |
| 764,657 | 7/1904 | Clasmann | 422/304 |
| 797,298 | 8/1905 | Loew | 422/304 |
| 1,734,585 | 11/1929 | Ladewig et al. | 422/304 |
| 2,981,266 | 4/1961 | Tamburri | 134/72 |
| 2,997,048 | 8/1961 | Gertken et al. | 134/72 |
| 3,179,117 | 4/1965 | Gibson et al. | 134/107 |
| 3,258,019 | 6/1966 | Bellas et al. | 134/123 |
| 3,986,832 | 10/1976 | Smorenburg | 422/106 |
| 4,061,152 | 12/1977 | Babunovic | 134/73 |
| 4,415,539 | 11/1983 | Pohorski | 422/304 |
| 4,561,904 | 12/1985 | Eberhardt | 134/72 |
| 4,807,319 | 2/1989 | Poitevin | 134/72 |
| 4,888,155 | 12/1989 | Posey et al. | 422/106 |
| 4,946,718 | 8/1990 | Napadow | 427/424 |
| 5,033,609 | 7/1991 | Long | 198/774.3 |
| 5,103,846 | 4/1992 | Clark et al. | 134/72 |
| 5,133,375 | 7/1992 | Schinzing et al. | 134/123 |
| 5,285,802 | 2/1994 | Soderquist | 134/123 |
| 5,622,196 | 4/1997 | Lunogo | 134/72 |

OTHER PUBLICATIONS

Edginton, D., "Adventures of an Idea Man", *Des Moines Business Record*, 1 page, (Mar. 31, 1997) No Page Number.

*Primary Examiner*—Robert J. Warden, Sr.
*Assistant Examiner*—Fariborz Moazzam
*Attorney, Agent, or Firm*—Schwegman, Lundberg, Woessner & Kluth PA

[57] ABSTRACT

The present invention provides a low-cost and practical method for cleaning objects such as wheelchairs on a continuous basis. In one embodiment, the apparatus of the present invention is a mobile, self-contained system in which objects are cleaned and sanitized as they travel in a U-shaped path within a wash chamber. As the objects enter the first side of the wash chamber, suitably located water jets spray the objects with a mixture of detergent and water to remove associated foreign materials until shortly after the objects make a U-turn. At this point, the objects are first sprayed with a mixture containing a rinse agent and water, then with a spray containing disinfectant and water. The objects are thereafter dried by suitable drying means such as a high velocity air curtain system. The continuous washing system of the present invention preferably has a self-contained water heater to pre-heat the water prior to its being sprayed onto the objects. The system preferably also has a recycling path wherein water which has been sprayed onto the objects is collected and filtered in a water reservoir prior to being used again in the system.

28 Claims, 12 Drawing Sheets

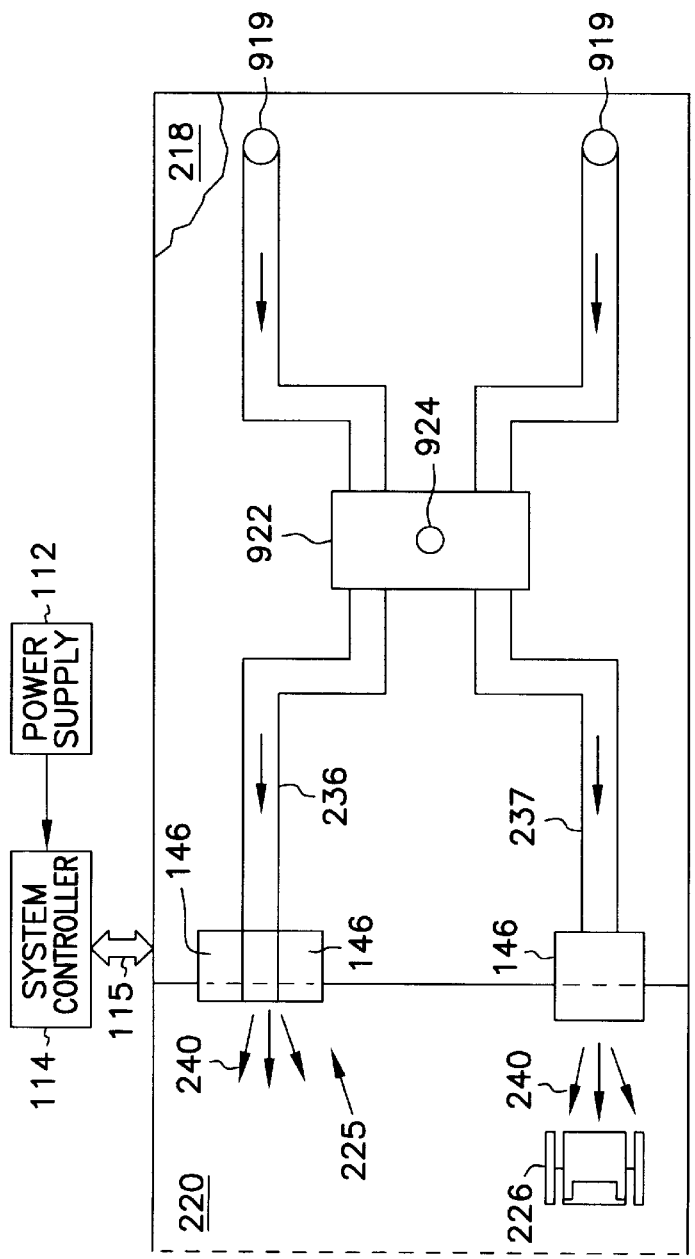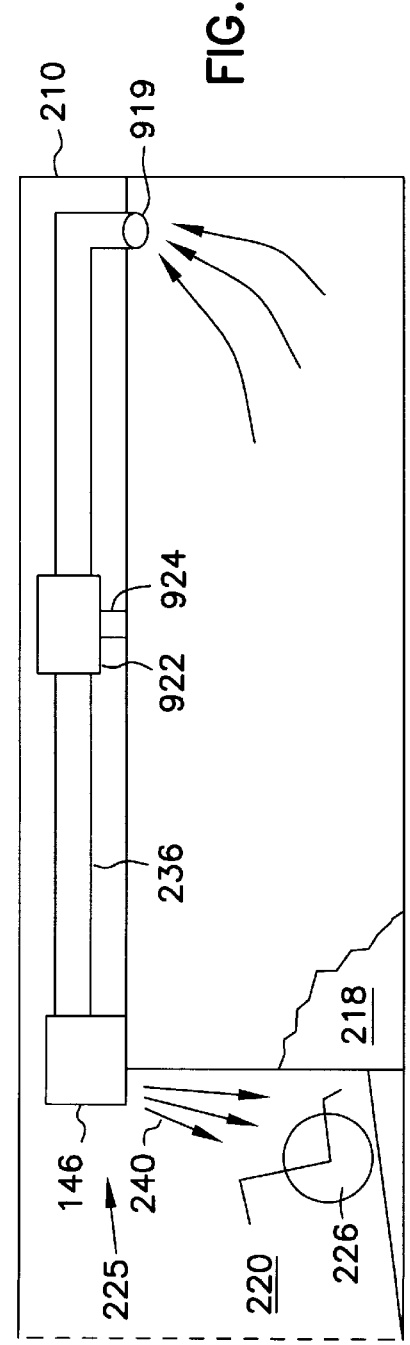

CONTINUOUS WASHING SYSTEM

BACKGROUND OF THE INVENTION

1. Field of the Invention

The present invention relates to a method and apparatus for cleaning objects, and particularly to a portable and continuous washing system.

2. Background of the Invention

Maintaining large objects, such as wheelchairs, shopping carts, and bakery racks in a clean and sanitary condition can be problematic. Wheelchairs, in particular, are commonly stained with urine, milk scale and large food particles. Many institutions still wash wheelchairs by hand in a conventional shower stall, using bottled spray cleaner and a rag or sponge. Such a process can be extremely unpleasant for the worker and typically takes up to 30 minutes or more per wheelchair.

Some institutions use a type of "power washer" to clean large objects using pressures of up to about 1500 psi. When water is dispensed at such high pressures, however, the wheel bearings and other components of the object can be negatively impacted. Furthermore, this task is typically completed in an unsanitary parking lot.

An improved method for cleaning wheelchairs currently used by a few institutions involves the use of a wheelchair cleaning machine resembling a large dishwasher. However, these machines are capable of washing only one wheelchair at a time and are labor-intensive to operate and maintain. Such an apparatus is described in U.S. Pat. No. 5,133,375 to Schinzing et al and in U.S. Pat. No. 5,285,802 to Soderquist.

A method for washing objects is described in U.S. Pat. No. 5,622,196 to Luongo. In Luongo, objects enter from one end and exit from another after being cleaned with moving sprayer arms at very high pressures of about 3000 psi. Since the water in Luongo is not heated and there is apparently no rust inhibitor used nor any drying means for the exiting objects, it is likely this process promotes rusting of metal objects. Furthermore, the use of such high pressures likely negatively impacts not only wheel bearings, but surface coatings as well.

A trailer-mounted cleaner for cleaning grocery carts is described in U.S. Pat. No. 3,179,117 to Gibson, et al. A group of "nestled" carts in Gibson are loaded through the side opening of a trailer through use of trams, and are "jostled" through the washing chamber to exit at the opposite end. Specifically, the sanitized carts exit the trailer at a point when the lugs of a tram chain come out of engagement with the bottom of the carts, such that the group of carts slides out the exit by force of gravity. There is no drying means provided for in Gibson as the carts are allowed to air dry on site or in the store. The jostling encountered by the carts in Gibson likely negatively impact bearings on the shopping carts, which can shorten their useful life considerably. It is also likely that since the carts remain nestled throughout the cleaning process, each cart is not as thoroughly cleaned as it would be if cleaned individually. Furthermore, the location and manner of the exiting means are very impractical as this arrangement requires an operator to be present when the carts begin sliding down the exit ramp, so they can be stopped before they roll away from the apparatus.

Thus, what is needed is a low-cost and practical method for thoroughly cleaning wheelchairs, shopping carts, bakery racks and other large objects at a high rate of speed using minimal labor, without causing damage to the objects themselves.

SUMMARY OF THE INVENTION

The present invention provides a low-cost and practical washing system for cleaning large objects such as wheelchairs on a continuous basis. In one embodiment, the apparatus of the present invention is a mobile, self-contained system in which objects being cleaned follow a U-shaped path in a wash chamber. As the objects enter the first side of the wash chamber, suitably located water jets spray the objects with a mixture of detergent and water until shortly after the objects make a U-turn. At this point, the objects are first sprayed with a suitable rinse aid which preferably also contains a rust inhibitor, then with a suitable disinfectant. The objects are thereafter dried by suitable drying devices.

The novel design of the present invention allows the objects to enter and exit through the same opening so that only one person is needed to operate the entire system from one location after necessary preliminary tasks are completed. Furthermore, by using a U-shaped path for the objects, the wash chamber has the further advantage of being compact as compared with a wash chamber in which objects travel in a straight line, entering and exiting from different openings.

In one embodiment, a high velocity air curtain system of sufficient size is used to create a vertical wall of air over the opening of the wash chamber to contain water vapor and mist inside the wash chamber. The air curtain also serves as a means for removing remaining water from the sanitized objects upon exiting the wash chamber.

The washing system of the present invention preferably has a self-contained water heater to pre-heat the water prior to its being sprayed onto the objects. The system preferably also has a recycling system wherein water which runs off the objects is collected and filtered in a reservoir, for use again in the system.

These and other features, aspects and advantages of the present invention will become better understood with regard to the following description, appended claims and accompanying drawings.

BRIEF DESCRIPTION OF THE DRAWINGS

FIG. 9A is a simplified top view of a drying means in accordance with one embodiment of the present invention.

FIG. 9B is a simplified side view from the exiting side of the continuous washing system of a drying means in accordance with one embodiment of the present invention.

DETAILED DESCRIPTION OF INVENTION

In the following detailed description, reference is made to the accompanying drawings which form a part hereof, and in which is shown by way of illustration, specific embodiments in which the invention may be practiced. These embodiments are described in sufficient detail to enable those skilled in the art to practice the invention, and it is to be understood that other embodiments may be utilized and that structural, procedural and system changes may be made without departing from the spirit and scope of the present invention. The following detailed description is, therefore, not to be taken in a limiting sense, and the scope of the present invention is defined by the appended claims.

Numbering in the Figures is usually done with the hundreds and thousands digits corresponding to the figure number, with the exception that the same components may appear in multiple figures.

The present invention provides a method and apparatus for providing a low-cost, portable and practical method for cleaning wheelchairs, grocery carts or other objects on a continuous basis with a continuous washing system. This is unlike conventional batch-operated systems in which a fixed number of objects are placed in a washing system at the beginning of a cleaning cycle, and remain in that same location throughout the entire cleaning process. In the detailed description which follows, a control system for the continuous washing system is first described, followed by an overview of the apparatus for housing and transporting the system. Details as to the wash chamber and guide means for transporting the objects through the wash chamber are described next, followed by details as to a washing means, including one arrangement of water lines and water jets for cleaning, rinsing and disinfecting the objects. The various flow paths for filling, cleaning and draining operations are also described. Lastly, one embodiment of a drying means is described followed by an example to further illustrate another embodiment of the present invention.

Control System

Figure 1:
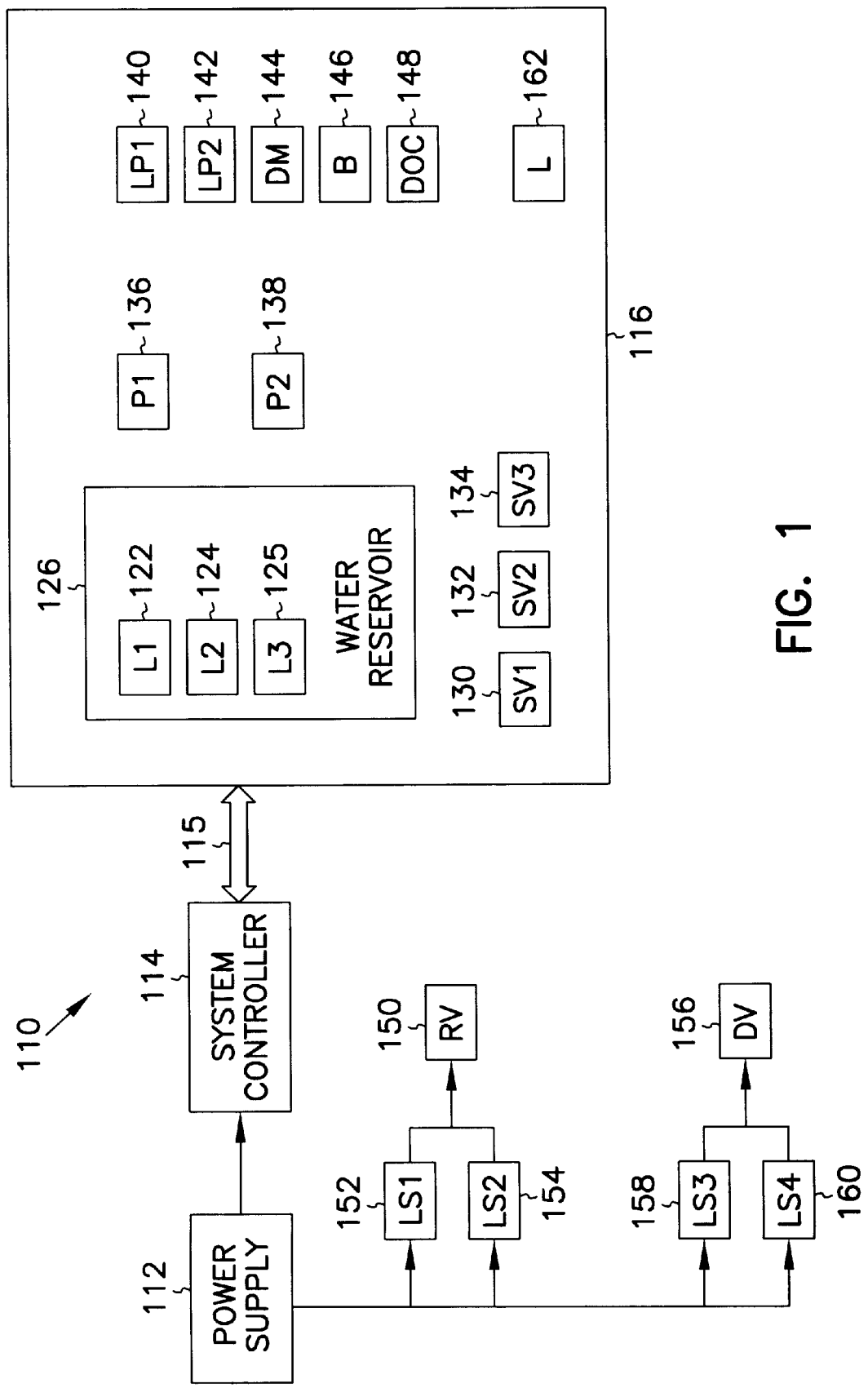
FIG. 1 is a block diagram of a control system for operating a continuous washing system in accordance with one embodiment of the present invention.

Referring to FIG. 1, a block diagram of one embodiment of a continuous washing system 110 is shown comprising a power supply 112, a system controller 114, a data bus interface 115, and a system unit 116. In one embodiment, the system controller 114 comprises a computer processor, non volatile memory, input device and monitor. The system controller 114 can be coupled to various sensing devices to monitor certain variables or physical phenomena, process the variables, and output control signals to control devices to take necessary actions when the variable levels exceed or drop below selected or predetermined values. Such amounts are dependent on other variables, and may be varied as desired by using the input device of the controller. The non volatile memory may comprise a disk drive or read only memory device which stores a program to implement the above control and store appropriate values for comparison with the process variables as is well known in the art.

In a further embodiment, the system controller 114 may comprise a machine coupled to a control panel. Buttons and dials can be provided on the control panel to allow modification of the values and to control the continuous washing system 110 to enter desired states such as hot water fill, cleaning and sanitizing mode, drying mode and so forth. The system controller 114 can also be programmed to ignore data from the various sensors when the operator activates certain other buttons and dials on the control panel as he deems necessary, such as fill override or emergency stop buttons. Alternatively, or in addition to the foregoing, the control panel can include indicator lights or digital displays to signal the operator as to the status of the operation. Indicator lights can also be used to signal that a certain variable level is outside the desired range, therefore alerting the operator to the need for corrective action. In such an embodiment, the corrective action is not automatic, but requires the operator to initiate corrective action either by pushing a specific button or turning a specific dial on the control panel, or by manually adjusting the appropriate valve or device.

At start-up, the power supply (or energy supply) 112 is activated so that the system controller 114 can be turned on. The power supply 112 can be from any suitable source of energy such as a small generator, a solar energy system having solar panels and storage batteries, or a normal power grid system, and so forth. The continuous washing system 110 can operate on either alternating current (AC) or direct current (DC), and the voltage can be any suitable voltage such as 22 volts or 220 volts, depending on the source of the power.

Figure 6:
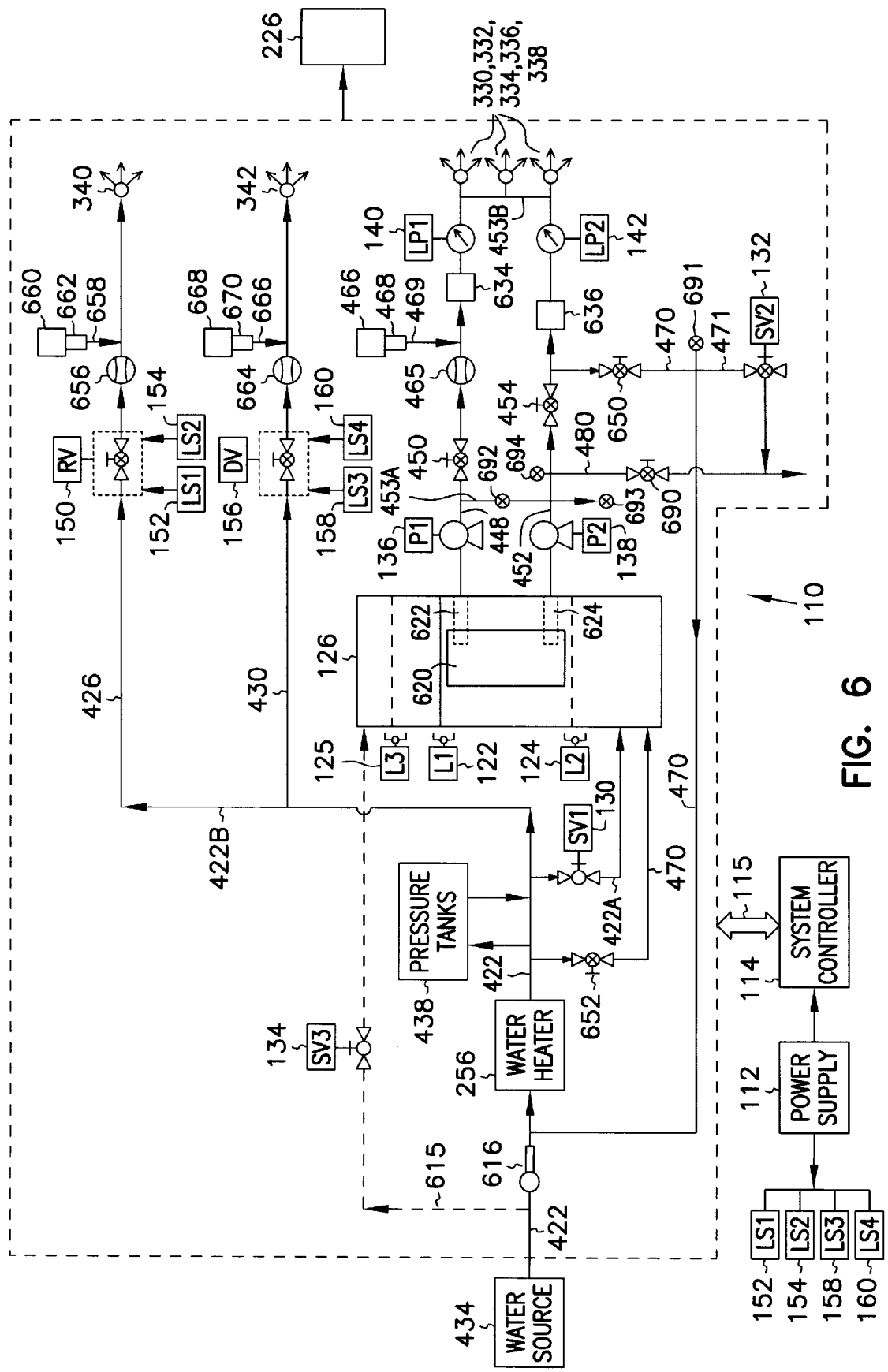
FIG. 6 is a simplified schematic illustration of a continuous washing system and its associated control system during a fill operation in accordance with one embodiment of the present invention.
Figure 7:
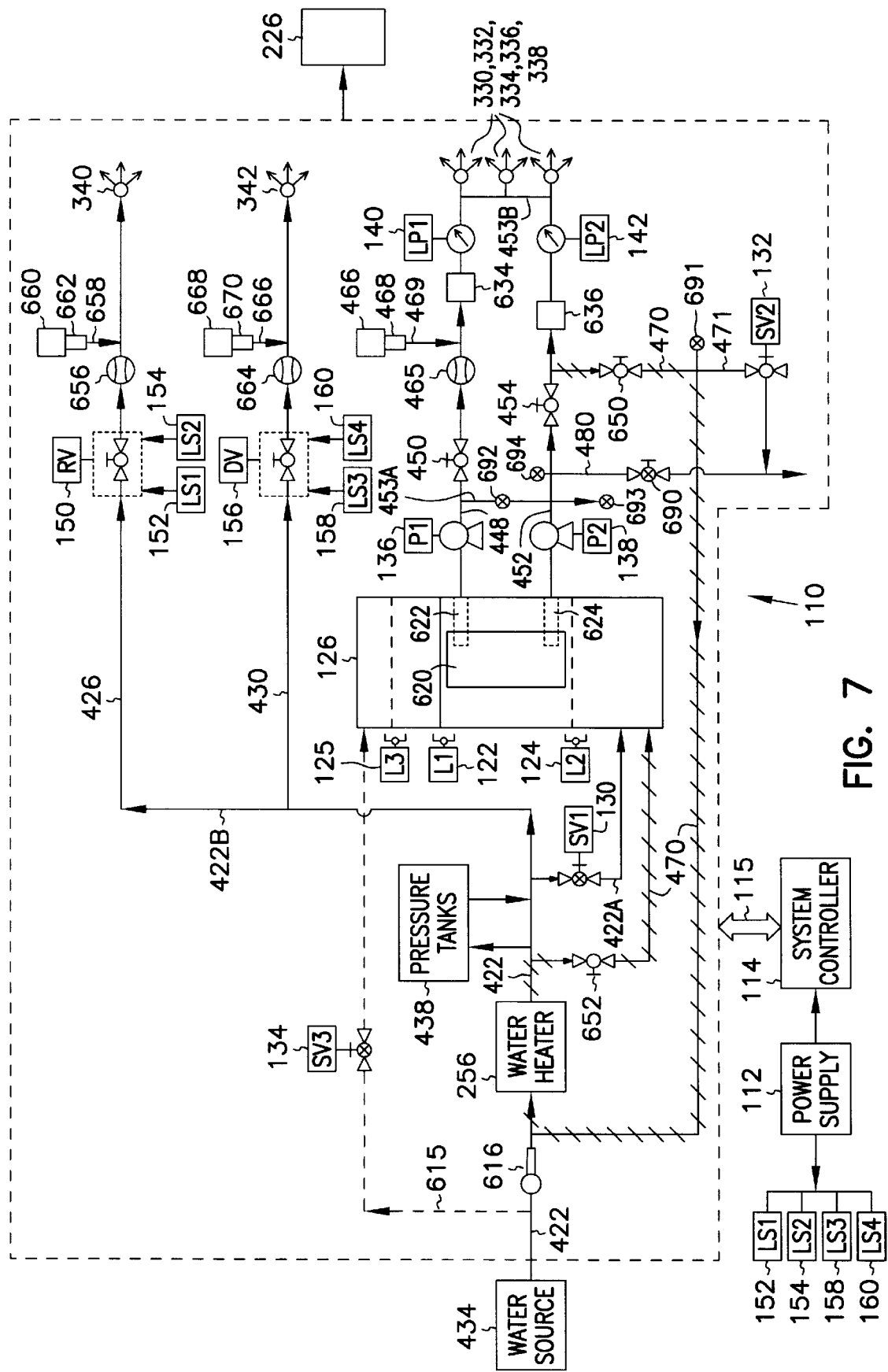
FIG. 7 is a simplified schematic illustration of a continuous washing system and its associated control system during a cleaning and sanitizing operation in accordance with one embodiment of the present invention.
Figure 8:
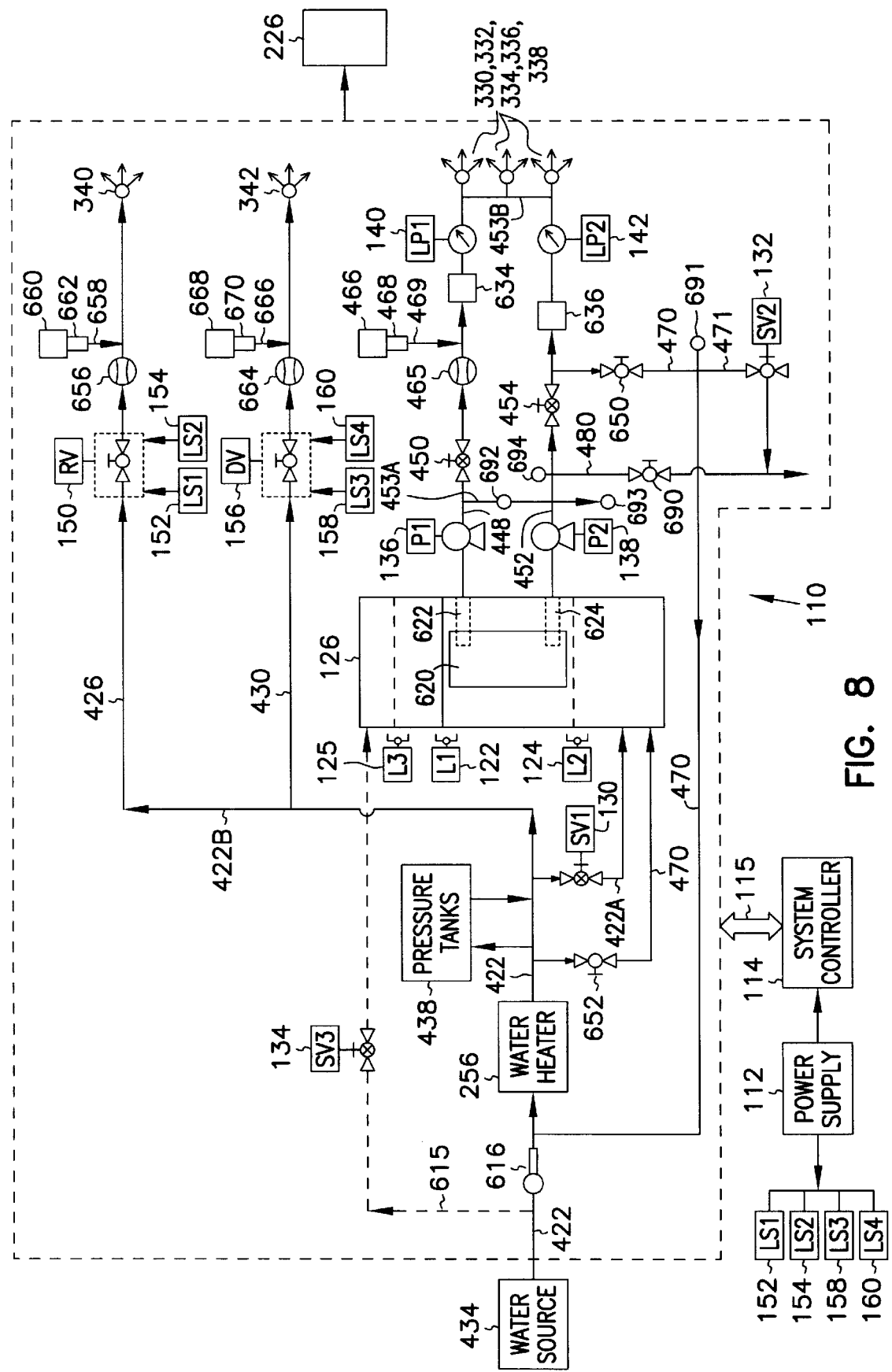
FIG. 8 is a simplified schematic illustration of a continuous washing system and its associated control system during a draining operation in accordance with one embodiment of the present invention.

In the embodiment shown in FIG. 1, the system controller 114 receives signals from three float sensors: A first high water level sensor (L1) 122, a second high water level sensor (L3) 125 and a low water level sensor (L2) 124 in a water reservoir 126. Whenever the level of water exceeds a predetermined first high level in the water reservoir 126, the first high water level sensor (L1) 122 outputs information in the form of control signals to the system controller 114. Accordingly, whenever the level of water exceeds a predetermined second high level in the water reservoir 126, the second high water level sensor (L3) 125 outputs information in the form of control signals to the system controller 114. In the same manner, whenever the level of water drops below a predetermined low water level in the water reservoir 126, the low water level sensor (L2) 124 outputs information to the system controller 114. The information which is output to the system controller 114 by the various sensors can be via wires or wireless transmitters. The system controller 114, using standard PID control algorithms, responds by opening the appropriate flow path as shown in FIGS. 6, 7 and 8 discussed below.

As shown in FIG. 1, the devices receiving input from the system controller 114 can include a first service valve (SV1) 130, a valve through which heated water flows into the water reservoir 126 during a hot water fill, a second service valve (SV2) 132, a valve through which water flows to be drained, and a third service valve (SV3) 134, a valve through which water flows into the water reservoir 126 during a cold water fill. Other devices which can receive input from the system controller 114 include a first pump (P1) 136 and a second pump (P2) 138, two low pressure switches (LP1) 140 and (LP2) 142, a drive motor (DM) 144 connected to a guiding mechanism for moving the objects being cleaned, one or more blowers (B) 146 for use during the drying cycle, and a digital object counter (DOC) 148. The interior lights (L) 162 can also be controlled by the system controller 114.

In the embodiment shown in FIG. 1, two valves in the continuous washing system 110 receive input from limit switches which are triggered by the objects being cleaned. Specifically, a rinse valve (RV) 150 first receives input from a first limit switch (LS1) 152 to open, then from a second limit switch (LS2) 154 to close. Similarly, a disinfect valve (DV) 156 first receives input from a third limit switch (LS3) 158 to open, then from a fourth limit switch (LS4) 160 to close.

The rinse valve (RV) 150 and disinfect valve (DV) 156, as well as other manual or check valves used in the continuous washing system 110 can also be controlled by the system controller 114. Indeed, it will be appreciated by those in skilled the art that any number of other configurations of the continuous washing system 110 are possible in which any number of valves and devices such as flow regulators, temperature and pressures sensors, and so forth, can be connected to a suitable system controller so that the operation is completely automated. Alternatively, only certain valves and devices can be connected such that the operation is only partially automated as described in FIG. 1, and shown in more detail in FIGS. 6, 7, and 8. The communication for all input and output is via a suitable data bus interface 115.

The various transducing devices used to measure parameters which characterize the predetermined high and low water levels in the water reservoir, and the various signals generated thereby, may take a variety of forms or formats. For example, the control elements of the system can be implemented using electrical analog, digital electronic, pneumatic, hydraulic, mechanical or other similar types of equipment or combinations of one or more of such equipment types. While one embodiment of the invention utilizes a combination of pneumatic control elements in conjunction with electrical analog signal handling and translation apparatus, the apparatus and method of the invention can be implemented using a variety of specific equipment available to and understood by those skilled in the process control art.

Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter or representative of a desired process value, the signal will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Overview of Housing and Transporting System

Figure 2:
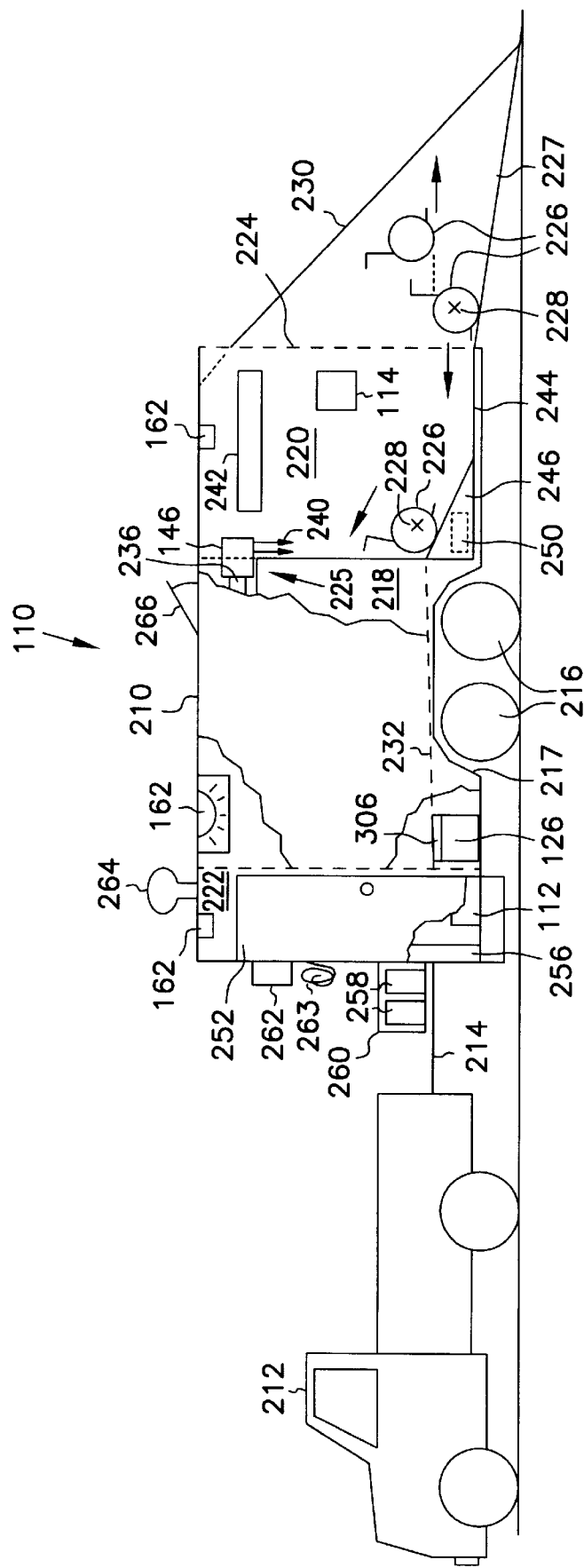
FIG. 2 is a simplified partially-broken away side view from the entering side of the continuous washing system of a housing and transporting apparatus in accordance with one embodiment of the present invention.

Referring to FIG. 2, a simplified partially-broken away side view of one embodiment of the apparatus of the present invention is shown in which the continuous washing system 110 is housed within a trailer 210 pulled by a vehicle 212 having a hitch 214. Although FIG. 2 depicts a pick-up truck as the vehicle 212, in practice, the vehicle 212 can be any type of vehicle which is of sufficient size and power to pull a large trailer 210 weighing as much as about 2,700 kg (6,000 lbs) or more. In an alternative embodiment, the entire continuous washing system 110 is contained within the trailer of a semi-truck.

The exterior of the trailer 210 contains the necessary accessories required for use on public roadways, and the trailer 210 also has an adequate number of wheels 216 located in any suitable location. In the embodiment shown in FIG. 2, the trailer 210 has four wheels 216 (two shown) located in the center of the trailer so as to best distribute the load within. The trailer 210 preferably has extra-wide axles such that the wheels 216 and wheel wells 217 extend beyond the width of the trailer 210 itself. In this way, the trailer 210 is adequately supported and maximum space is provided for a wash chamber 218 within. FIG. 2 also shows two propane tanks 258 located on a receptacle 260 attached to the outside of the trailer 210 for storing liquid propane, which can be used to provide the energy for a water heater 256. Also shown is a fuel tank 262 which can be used to store fuel for the power supply 112, such as a gas-driven generator. A power cord (extension cord) 263 can also be stored on the exterior of the trailer 210 as shown. The power cord 263 is used in an alternative embodiment to connect to the power supply 112 of a host facility, such as a normal power grid system.

The trailer 210 is preferably of a sufficient size and design to contain the wash chamber 218, an operator area 220 and an equipment area 222. In the embodiment shown in FIG. 2 the operator area 220 is in the rear portion of the trailer 210, the equipment area 222 is in the front portion of the trailer 210, and the wash chamber 218 is in the center section. In one embodiment, the trailer 210 is about 2.4 m (eight [8] ft) in width and height, and about 4.8 m (24 ft) long, although the particular size and shape of the trailer 210 is not critical. Preferably, however, the trailer 210 is of a width such that it can easily fit within one driving lane on highways and roads, although it can also be designed as an "extra-wide" vehicle, and be properly identified and escorted on the roadways.

Figure 3:
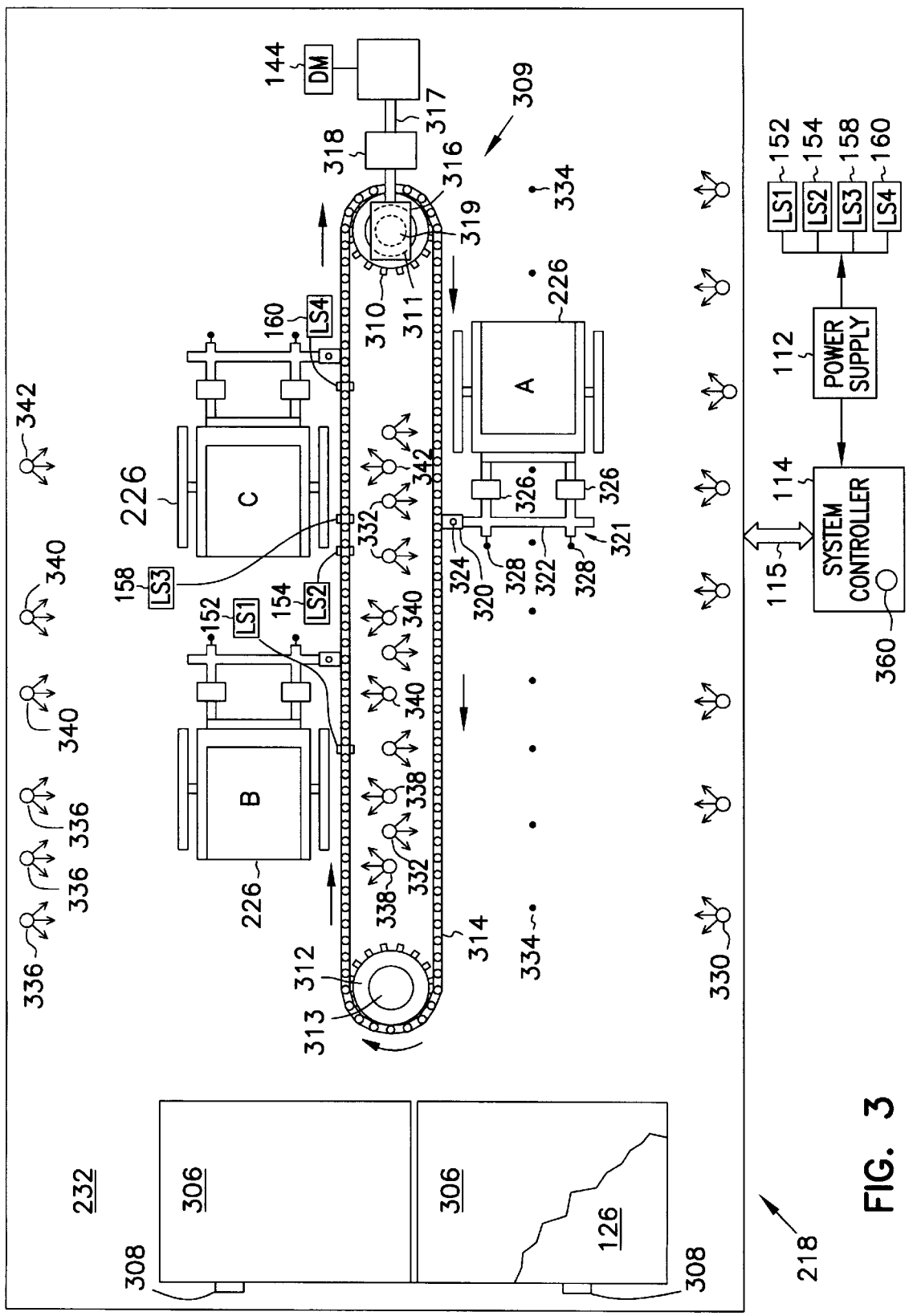
FIG. 3 is a simplified top view of a wash chamber showing a guide means for transporting objects through the wash chamber in accordance with one embodiment of the present invention.

The equipment area 222 itself preferably contains supplies and much of the equipment necessary for a cleaning operation, including, but not limited to the power supply 112, heating means (such as the water heater 256), pumping means (such as the first and second pumps (P1) 136 and (P2) 138, respectively, water storage means (such as the water reservoir 126), and various supplies including hoses and chemicals necessary for cleaning and sanitizing. Locating the equipment in a separate equipment area 222 such as is shown in FIG. 3, helps to reduce the noise not only within the wash chamber 218 but also to the surrounding area as well. The equipment area 222 is preferably easily accessed by an outer access door 252. In one embodiment, the access door 252 is on the driver's side of the trailer 210 to provide easy access for the operator. The use of the separate access door 252 not only allows easy access to the equipment but also provides an added measure of security against theft. Further precautionary measures against theft include bolting equipment to the floor.

The operator area 220 is preferably used to house the system controller 114, which can be a machine coupled to a control panel, and can also contain one or more supply racks 242 within easy reach of the operator. The supply racks 242 can contain items necessary for the actual operation of the system, as well as replacement parts for the objects 226 being cleaned. By providing replacement parts in this handy location, objects 226 can easily be repaired before or after cleaning. Other equipment and tools can also be stored in the operator area 220 including mops, towels, screwdrivers, etc. Preferably the trailer floor 244 in the operator area 220 is made from a non-skid flooring material and the interior walls of the operator area 220 are finished to provide an appealing and professional look. In one embodiment there is also a bar code reader, i.e. scanner, and computer monitor (not shown) for inputting and displaying information about the service history of each object 226.

The trailer 210 necessarily has an opening 224 to accommodate objects 226 to be cleaned. Although the opening 224 is shown in the rear of the trailer 210 in FIG. 2, in practice the opening 224 can be in any suitable location, and there can be more than one opening 224 through which objects 226 enter and exit. The opening 224 can be provided with any suitable covering or door, or no covering at all. In the embodiment shown in FIG. 2, the opening 224 is provided with a fold-down door or "external ramp" 227 which is mounted to the trailer 210 by any suitable connecting apparatus, such as with hinges, which can be piano-type hinges or any other suitable type of hinges. Objects 226 having associated foreign materials or "dirt" (filth, grime, food particles, urine, etc.) 228 are loaded onto the external ramp 227, and into the operator area 220 through the opening 224. Because of the novelty of the curved or arcuate path which the objects 226 thereafter follow within the wash chamber 218, objects 226 which have been cleaned are preferably removed through the same opening 224 and exit off the same external ramp 227 after being cleaned.

In one embodiment, the external ramp 227 is about the same length and width as the opening 224 and is preferably raised or lowered with the use of one or more cables 230, either manually or using an automated apparatus. Each cable 230 is preferably affixed to the external ramp 227 on one end and to the interior of the rear end of the trailer 210 on the other end as shown in FIG. 2. Preferably there are two cables 230, with one cable 230 located on each side of the trailer 210 and external ramp 227. When extended, the end of the external ramp 227 furthest from the back end of the trailer 210 is preferably at ground level while the front end of the external ramp 227 preferably remains at about the same level as the trailer floor 244 such that a slight slope is created. It should be understood that any suitable type and configuration of external ramp 227 can be used, such as a pull-out ramp, a detached portable ramp, and so forth, as long as the ramp is able to support one or more objects 226 at a time.

In the embodiment shown in FIG. 2, a wash chamber floor 232 is elevated above the level of the trailer floor 244 so that the water reservoir 126 can be recessed below the wash chamber floor 232 and so that the wheel wells 217 on either side of the trailer 210 do not create a raised area in the wash chamber floor 232. In this embodiment, an internal ramp 246 can be used for the entering and/or exiting objects 226. Alternatively, the internal ramp 246 can be located on the entering side only and the objects 226 loaded such that there is a step down rather than a ramp on the exiting side. Preferably the exit area for the wash chamber 218 is equipped with a drip pan 250 (shown behind the internal ramp 246 in FIG. 2) for collection of remaining water which drips from the objects 226. The wash chamber floor 232 also preferably slopes at least a few degrees towards the front end of the trailer 210 as shown in FIG. 2, to allow water to run-off into the water reservoir 126 to be recycled for further use as described in more detail below.

The trailer 210 is also equipped with all of the features recognized by those skilled in the art to be necessary for such a cleaning operation. This includes, but is not limited to, a first roof vent 264 appropriately sized and positioned to vent the combustion products of the water heater 210, and a second roof vent 266 in the area of the wash chamber 218 for venting moist warm air to the outside during the actual operation. Such equipment can also include internal lighting (L) 162 in the operator area 220, the wash chamber 218 and equipment area 222. In one embodiment, the lighting (L) 162 for the wash chamber 218 and in the equipment area 222 is provided by a light secured to the ceiling of the trailer 210 in an area which is external to the wash chamber 218, but located just above an opening into the wash chamber 218. The opening is preferably covered with glass, plastic, or other suitable material which will allow light to pass through, but not allow moisture to escape into the area above the wash chamber 218 or into the equipment area 222.

Wash Chamber and Guide Means for Objects

A major feature of this invention is the wash chamber 218 which can be of any suitable size and shape to accommodate the particular objects 226 being cleaned. In the embodiment shown in FIG. 2, the entire wash chamber 218 is about the same width as the trailer 210, but is only about 3.7 m (12 ft) in length and about 1.5 m (five [5] ft) in height, creating a very compact and efficient wash area. The drying means 225 is located proximate to, or preferably above, the wash chamber 218. In one embodiment, the drying means 225 comprises one or more suitable plenum chambers 236 and at least one blower (B) 146 which together generate an air curtain 240 near the opening 224 of the wash chamber 218 as shown in FIG. 2. In an alternative embodiment, in which taller objects can be washed, the drying means 225 can be located on the outside of the trailer 210 or in another suitable location. In another alternative embodiment, the wash chamber 218 is about the same size and shape as the trailer 210 such that there is a much smaller or no internal operator area 220. Such an embodiment can be useful if the trailer 210 itself is very small, providing for an even more compact washing system. In yet another alternative embodiment, there is more than one wash chamber 218 within the trailer 210. Such an embodiment can be useful if it is desired to wash more than one type of object 226 at a time, or if the objects 226 being washed are small, thus requiring one or more small or even "miniature-sized" wash chambers 218.

The wash chamber 218 is preferably designed so that objects 226 can follow a curved path through the wash chamber 218 as shown in FIG. 3. This novel design allows the objects 226 to enter and exit through the same opening 224 so that only one person is needed to operate the entire system from one location, i.e. the operator area 220, after the connection to the water source has been made, the hot water heater has been activated and other necessary preliminary tasks are completed. Furthermore, by using a curved path such as a generally U-shaped, C-shaped or even a J-shaped path for the objects 226, the wash chamber 218 has the further advantage of being compact as compared with a wash chamber in which objects 226 travel in a generally straight line, entering and exiting from different openings.

In one embodiment the objects 226 follow a U-shaped path as shown in FIG. 3. As is shown, there is adequate room for objects 226 to enter the wash chamber 218 along one side of the opening 224, travel in a substantially straight path, make a "U-turn" at the far end of the wash chamber 218, and return along the opposite side of the wash chamber 218 to exit out the same opening. In other words, the objects 226 in this embodiment preferably advance along a relatively horizontal path which includes not only a straight portion but an arcuate or loop portion. As noted above, although the path is considered to be relatively horizontal, the entire U-path can be sloped towards the loop portion so that the water and chemicals can run off into the water reservoir 126. In an alternative embodiment, the U-shaped path is level and there can be suitably located outlets within the wash chamber floor 232 itself through which fluid can drain to a suitable sump or reservoir. Other configurations are possible, however, including, but not limited to a wash chamber 218 in which objects 226 follow an L-shaped path, or a parallel L-shaped path such that one of the "L's" is essentially a backwards "L" such that the objects 226 enter and exit from adjacent openings. In yet another alternative embodiment, objects 226 can enter and exit through opposite openings of a continuous washing system 110 as long as there is an adequate water delivery system provided within. Preferably, in such an embodiment, there is also a suitable automated mechanism located outside of the wash chamber 218 for returning the objects 226 to the area near the opening from which they entered.

In one embodiment, the water reservoir 126 is located within the wash chamber 218. Preferably the water reservoir 126 is recessed below the wash chamber floor 232 such that the water reservoir cover 306 actually forms a part of the wash chamber floor 232. Run-off from the various water jets drains into the water reservoir 126 through a small gap between the water reservoir cover 306 and the frame of the water reservoir 126 itself. Any suitably-sized gap can be provided for as long as enough water can drain through to the water reservoir 126 to minimize or preferably prevent back-up of water within the wash chamber 218 itself. In one embodiment the gap is about 1.9 cm (0.75 in). In an alternative embodiment, a sufficient number of holes are located in the water reservoir cover 306 such that run-off can drain through the holes into the water reservoir 126 instead of, or in addition to, the gap noted above.

The water reservoir cover 306 is preferably hinged with a suitable number and type of hinges 308, such as piano hinges, so that it can be easily raised and lowered, such as with a thumb hole near the front edge. In one embodiment the wash reservoir cover 306 is divided into two parts such that there are two lids, each covering about half of the water reservoir 126 as shown in FIG. 3. In this way, when access to only one portion of the water reservoir 126 is desired, only one of the lids needs to be raised, thus minimizing loss of heat from the water in the water reservoir 126. Alternatively, the water reservoir cover 306 can be completely removable and be set in place or removed using any suitable lifting mechanism such as one or more recessed hand grips suitably located on the water reservoir cover 306 or one or more handles which lie flat when not in use. In the embodiment shown in FIG. 3, the water reservoir 126 is located towards the front end of the wash chamber 218, although it will be understood that the water reservoir 126 can be located anywhere within the wash chamber 218, but preferably at the lowest point such that the wash chamber floor 232 slopes towards the water reservoir 126.

The body of the wash chamber 218, including the wash chamber floor 232, water reservoir cover 306 and water reservoir 126 can be made from any suitable material that will not deteriorate after prolonged contact to water at a wide range of temperatures and to corrosive chemicals used with the water. Examples of suitable materials include, but are not limited to stainless steel, aluminum, fiberglass, polyethylene or other similar sheet material.

The wash chamber 218 also contains suitable guide means 309 which can be manual, mechanical and/or electrical, and so forth, to guide objects 226 along a curved path through the wash chamber 218. It will be appreciated by those skilled in the art that any suitable type of guide means 309 can be used which is capable of guiding objects 226 in a curved path, including, but not limited to drive chains, conveyor belts, trams, tracks, rails, and the like. For those guide means 309 which are not inherently curved, such as conveyor belts, a suitably located turntable at one end of the wash chamber 218 can be used to rotate the objects 226 so that they can follow a curved path, and exit from the same opening from which they entered. Preferably the guide means 309 keeps the objects 226 relatively stable during the process to minimize damage to the objects 226 themselves. In the embodiment shown in FIG. 3, the guide means 309 includes a drive chain 314 onto which a connecting means 321 is mounted. The connecting means 321 is then used to guide the objects 226 along the curved path.

Specifically, a drive sprocket 310 as well as a collar sprocket 312 are each mounted on a suitably located rotatable drive shaft 311 and rotatable collar shaft 313, respectively. Each rotatable shaft, 311 and 313, is also preferably equipped with suitable bearings, such as flange bearings 420 (shown in FIG. 4C), near the floor and ceiling of the wash chamber 218. The drive chain 314 is preferably a closed loop chain which engages the drive sprocket 310 and collar sprocket 312 as it rotates. In the embodiment shown in FIG. 3, the drive chain 314 rotates in an oval pattern, although it can also rotate in a circular pattern or other suitable closed loop pattern, depending on the design of the wash chamber 218 and path of the objects 226.

The speed of the drive chain 314 is preferably determined depending on the type and condition of the objects 226 being cleaned. In one embodiment, the speed of the drive chain 314 is variable, and controlled by a drive motor (DM) 144 having variable speeds connected to a gear box 316 having variable speeds. In the embodiment shown in FIG. 3, the drive motor (DM) 144 is connected to a right-angled gear box 316 via a rotatable first shaft 317. The right-angled gear box 316 in turn is connected to the rotatable drive shaft 311 via a second rotatable shaft 319. Preferably a torque limiter 318 is located between the drive motor (DM) 144 and the right-angled gear box 316 along the first rotatable shaft 317 as shown in FIG. 3. The torque limiter 318 can be mechanical or electrical, and acts as a safety release by limiting the amount of torque which is provided on the output side of the first rotatable shaft 317, i.e., the portion of the first rotatable shaft 317 which is between the torque limiter 318 and the right-angled gear box 316. The second rotatable shaft 319 is preferably designed to fit into the top of the rotatable drive shaft 311 such that the right-angled gear box 316, torque limiter 318, drive motor (DM) 144 and first rotatable shaft 317 are all located above the wash chamber 218.

The drive motor (DM) 144 can be any motor of suitable size and efficiency operating on D/C voltage, although A/C voltage can also be used. The drive motor (DM) 144 can be controlled by a suitable corresponding dial 360 on the system controller 114. It is important that the objects 226 not move through the wash chamber 218 so quickly that they are not adequately cleaned nor so slowly such that the operation of the continuous washing system 110 becomes inefficient. As stated above, preferably the speed of the drive motor (DM) 144 can be adjusted based upon the condition of the objects 226 being cleaned, such that those objects 226 which are dirtier, or perhaps have a large amount of dried-on particles such as food particles, can proceed through the wash chamber 218 at a slower speed than objects 226 which require less cleaning. In one embodiment the dial 360 is set at about "one (1)" or ten (10)% corresponding to a drive chain speed of about 0.55 m/min (22 in/min). In another embodiment the dial 360 is set at about "five (5)" or 50% corresponding to a drive chain speed of about 1.3 m/min (51 in/min). In yet another embodiment the dial 360 is set at about "ten (10)" or 100% corresponding to a drive chain speed of about 2.2 m/min (81 in/min). In an alternative embodiment, an electronic eye or similar device which has been designed to function under conditions of high humidity, can be installed to detect when objects 226 are too close together, or are otherwise being negatively impacted in the wash chamber 218.

Each object 226 to be cleaned can be attached in any suitable manner to the drive chain 314 with the connecting means 321 so that it is pulled through the wash chamber 218 in a manner which minimizes or preferably eliminates damage. In the embodiment shown in FIG. 3, the connecting means 321 comprises a wash arm 322 and a suitably-sized square tube 320 which is welded to one link of the drive chain 314. The wash arm 322 fits into the square tube 320 and is secured in place with a lock pin 324. In this way, each wash arm 322 is detachable and interchangeable allowing wash arms 322 of varying sizes and designs to be easily used to accommodate objects 226 of varying sizes and shapes. In one embodiment, the square tube 320 has an inner diameter of about 1.8 cm (0.75 in) and the wash arm 322 has an outer diameter of about 1.8 cm (0.75 in) and a length of about 76 cm (30 in) such that one end of the wash arm 322 can slide into the square tube 320. The connecting means 321 can be made from any suitable material including stainless steel, plastic and so forth.

Objects 226 can be attached in any suitable manner to the wash arms 322 so they can be pulled through the wash chamber 218 for cleaning. In the embodiment shown in FIG. 3, the objects 226 are wheelchairs, and the wash arms 322 have two magnets 326 secured in place with thumbscrews 328 and placed in contact with the vertical metal supports of the wheelchair. Although FIG. 3 shows the magnets 326 making contact with the vertical supports of the wheelchairs on the back side of the wheelchairs, alternatively, the magnets 326 can be aligned such that they make contact with the front side of the vertical supports instead. Other objects 226 such as shopping carts can be pulled through the wash chamber 218 with a relatively short wash arm 322 of about 15 cm (six [6] in) which has a J-shaped hook on the end opposite the end which attaches to the square tube 320. Modifications of the wash arm 322 can be made to accommodate the varying types of shopping carts. Other objects 226 which have wheels, such as food service carts, bakery racks, luggage carts, golf carts, bicycles, strollers, and so forth can be pulled along in a similar manner with a suitably designed wash arm 322 attached at a suitable place on the object 226 so there is adequate room within the wash chamber 218 for the object 226 to travel along a curved path. For example, the wash arm 322 for a shopping cart is preferably placed at about the mid-point of the shopping cart, rather than on the ends, so there is adequate clearance within the wash chamber 218 for the shopping cart to travel. In practice, any number of wash arms 322 can be used and any number of objects 226 can be attached to each wash arm 322 as long as the objects 226 are adequately cleaned and there is minimal or no damage to the objects 226.

For objects 226 which do not have wheels, such as engines, engine parts, lawn furniture, and so forth, a suitably designed platform having wheels or rollers can be used in connection with each wash arm 322, and the object 226 placed onto the platform. It is conceivable that an alternate type of guide means 309 can be employed such that the platform attaches to a type of connecting arm as described above, and does not require wheels or rollers, but merely provides a support on which to place objects 226. In such embodiments, the platform may have a suitable number of holes so that the objects 226 resting on the platform can be cleaned from below with a suitably located water delivery mechanism.

The drive chain 314 can be at any suitable height as long as objects 226 can be adequately guided. In one embodiment the drive chain 314 is located about 15 cm (six [6] in) to about 0.8 m (2.5 ft) from the wash chamber floor 232. In another embodiment, the drive chain 314 is located within a few centimeters of the wash chamber floor 232 so that the connecting means 321 between the drive chain 314 and the objects 226 can be nearer the bottom of the objects 226. In this way there is less obstruction for the operator if access is needed to the interior of the wash chamber 218 during an operation for any reason. For example, if an object 226 comes loose from the connecting means 321 near the rear of the wash chamber 218, the operator can more easily enter the interior of the wash chamber 218 (after removing objects 226 in his path), by stepping over each connecting means 321 rather than detaching each connecting means 321 between the entrance and the location of the particular problem.

As each object 226 progresses through the wash chamber 218 it is impacted with water from a suitable water delivery mechanism which can contain various chemicals, depending on the location. Any variation or combination of water and chemicals can be used, such that as the object 226 travels through the wash chamber 218 it receives adequate cleaning, and sanitizing, if desired, depending on the type and condition of the object 226. In the embodiment shown in FIG. 3, as each object 226 enters the wash chamber 218, it is preferably sprayed simultaneously with a number of entering outer detergent jets 330, entering inner detergent jets 332 and entering ceiling detergent jets 334. Object 226A, shown in FIG. 3, is in such a location within the wash chamber 218. Just after each object 226 makes the U-turn and begins traveling in the opposite direction, it can be sprayed with a number of exiting outer detergent jets 336 and exiting inner detergent jets 338. Object 226B is in a position to still be encountering some minimal spray from the exiting outer and inner detergent jets, 336 and 338, respectively. At or about this point the object 226 triggers the first limit switch (LS1) 152 which sends the appropriate signal to the rinse valve (RV) 150 (not shown) to open so that water is dispensed through a number of rinse jets 340 as shown in FIG. 3. The water from the rinse jets 340 can also contain a rinse agent and rust inhibitor. Although object 226B is still in a position to be encountering a minimal amount of spray from the exiting outer and inner detergent jets, 336 and 338, as noted above, it is also located in a position which is just after the first limit switch (LS1) 152 has been activated, such that spray from the rinse jets 340 is just beginning. As the object 226 continues traveling through the wash chamber 218 it next encounters the second limit switch (LS2) 153 which sends the signal to the rinse valve (RV) 150 (not shown) to close, stopping the flow of water from the rinse jets 340. The object 226 next encounters the third limit switch (LS3) 158, which sends the appropriate signal to the disinfect valve (DV) 156 (not shown) to open so that water preferably containing a disinfectant is dispensed through a number of disinfect jets 342. Object 226C is in a position to be about mid-way through receiving the spray from the disinfect jets 342, as it is between the third limit switch (LS3) 158 and a fourth limit switch (LS4) 160. As the object 226 continues traveling through the wash chamber 218 it next encounters the fourth limit switch (LS4) 160 which sends the appropriate signal to the disinfect valve (DV) 156 (not shown) to close, stopping the flow of water and disinfectant from the disinfect jets 342.

Any number of the various types of water jets can be used, but preferably there is a sufficient number of water jets located within the wash chamber 218 such that each object 226 is being thoroughly sprayed from both sides and from the top as it progresses through the wash chamber 218. In an alternative embodiment, the objects 226 are also sprayed from a suitable water delivery mechanism, such as water jets, located in the floor area. Preferably there is also a sufficient number of each "type" of water jet, i.e. detergent jets 330, 332, 334, 336 and 338, rinse jets 340, and disinfect jets 342 such that each object 226 is thoroughly cleaned (with a detergent), rinsed (with water which can contain rinse and rust agents), and disinfected, i.e. sanitized (with a disinfectant), prior to exiting the wash chamber 218. By disinfecting the objects 226 as described in the embodiments above, the continuous washing system of the present invention is also removing microbes remaining after washing, and thus sanitizing the objects 226. Such sanitization can be an important step for objects 226 which are in daily contact with humans such as wheel chairs, shopping carts, and so forth.

Water Lines and Water Jets

Figure 4A:
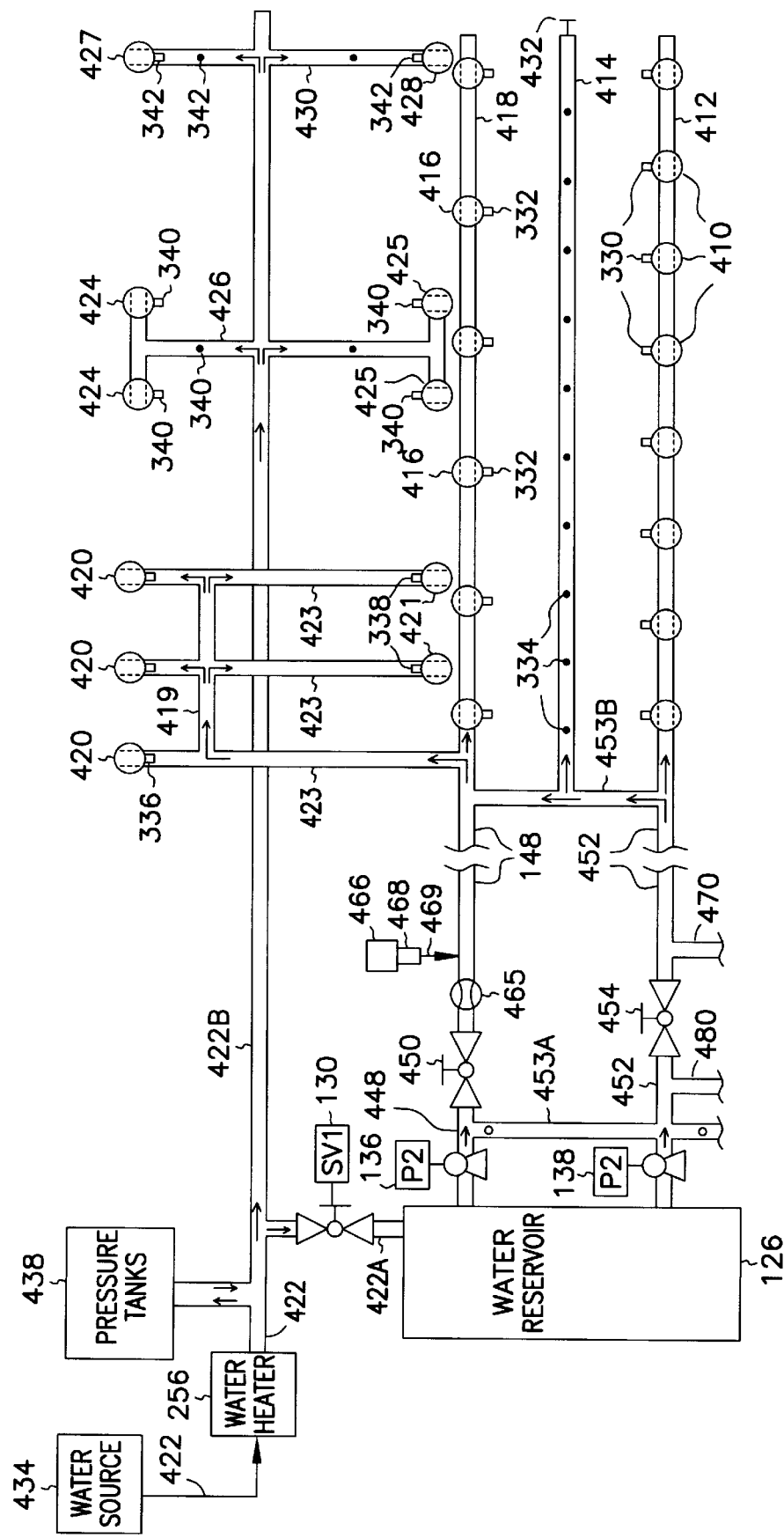
FIG. 4A is a simplified top view of an arrangement of water lines and water jets in accordance with one embodiment of the present invention.

Although the water flow paths to the various jets will be discussed in more detail below in FIGS. 6, 7, and 8, it is important to note that for a hot water wash, water from a water source 434 can be drawn in through a main water line 422 and pass through the water heater 256 as shown in FIG. 4A. Excess hot water can be stored in one or more pressure tanks 438. Water from either the water heater 256 or pressure tanks 438 then flows into the rinse jets 340 and disinfect jets 342 through a rinse-disinfect line 422B (a branch of the main water line 422) under line pressure, as shown in FIG. 4A. Although water from the pressure tank 438 can also flow into the water reservoir 126 through the first service valve (SV1) 130 in a reservoir line 422A (another branch of the main water line 422), typically it is water from the water heater 256 which flows through this line during the hot fill step, and then used water is recirculated in a recirculation line 470 (described in FIG. 7 below).

The water in the water reservoir 126 is then drawn into a first wash line 448 and through an open first wash valve 450 by the first pump (P1) 136, and also into a second wash line 452 and through an open second wash valve 454 by the second pump (P2) 138. The first and second pumps, (P1) 136 and (P2) 138, are preferably joined together, such as by first and second connecting lines, 453A and 453B, as shown. Therefore, although detergent from a detergent source 466 (which is metered by a suitable metering mechanism 468 into detergent line 469) is shown entering only the first wash line 448 (after a wash line flow regulator 465), because the first and second wash lines 448 and 452 are joined, there is likely detergent present in all of the detergent lines described below.

Figure 4B:
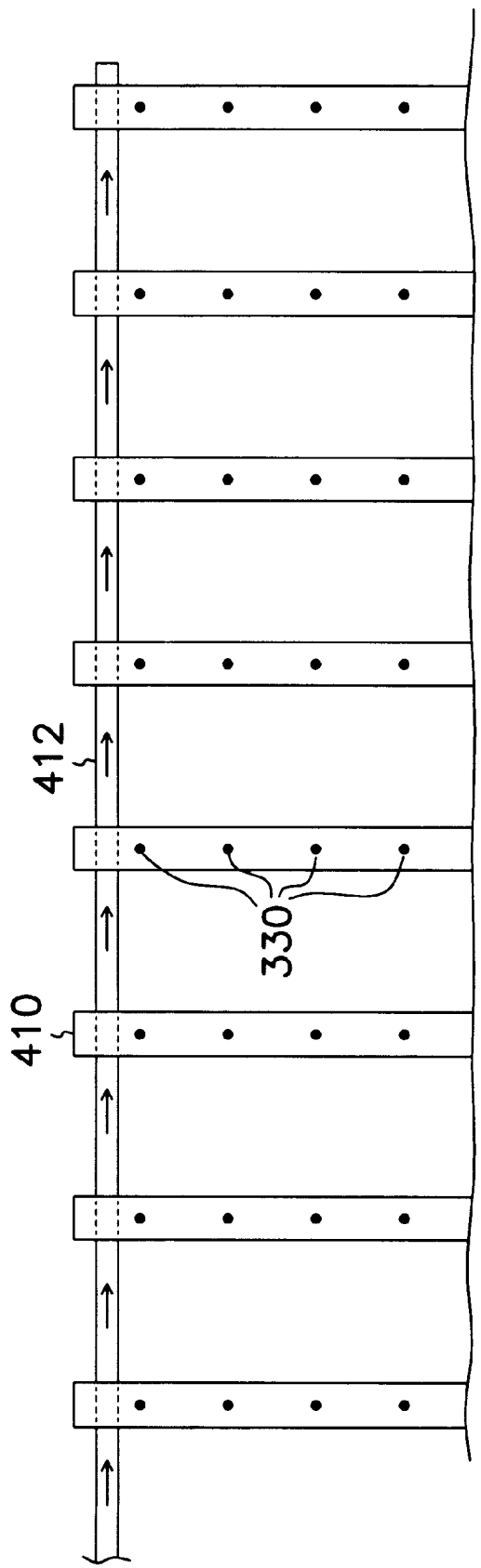
FIG. 4B is a simplified side view from the entering side of the continuous washing system of a series of entering outer detergent water jets and their respective supports in accordance with one embodiment of the present invention.

Any suitable type of water delivery mechanism can be used to clean, rinse and/or disinfect the objects, including spray nozzles or water jets which direct water and chemicals onto the objects 226. Other water delivery mechanisms can include spray bars, shower heads, spray brushes, and so forth. In the embodiment shown in FIG. 4A, water jets are used, including several entering outer detergent jets 330 which are located on eight (8) different outer vertical lines 410. The entering outer detergent jets 330 are provided with water via an outer horizontal line 412. The outer horizontal line 412 is in turn preferably provided with water from both the first and second wash lines 448 and 452 via the first and second connecting lines 453A and 453B as shown. As shown in a side view in FIG. 4B, each outer vertical line 410 has four (4) jets for a total of 32 entering outer detergent jets 330. Although the outer vertical lines 410 can be spaced any suitable distance apart, in one embodiment they are spaced about 35 cm (14 in) apart. The entering outer detergent jets 330 can be spaced in any manner along each outer vertical line 410 and are preferably adjustable in height to accommodate differently-sized objects 226. In one embodiment, the entering outer detergent jets 330 are evenly spaced along the outer vertical lines 410 about 30 cm (12 in) apart, with the lowest jet located at about 30 cm (12 in) from the floor.

Similarly, as shown in FIG. 4A, the entering inner detergent jets 332 are provided with water via a central horizontal line 418. The central horizontal line 418 is in turn provided with water from both the first and second wash lines 448 and 452 as described above. The inner entering detergent jets are located on six different central vertical lines 416, with each central vertical line 416 having four jets, for a total of 24 entering inner detergent jets 332. Although the central vertical lines 416 can be spaced any suitable distance apart, in one embodiment they are spaced about 35 cm (14 in) apart. The entering inner detergent jets 332 can be spaced in any manner along each central vertical line 416 and are preferably adjustable in height to accommodate differently-sized objects 226. In one embodiment, the entering inner detergent jets 332 are evenly spaced along the central vertical lines 416 about 30 cm (12 in) apart with the lowest jet located at about 30 cm (12 in) from the floor.

The ten (10) entering ceiling detergent jets 334 are located along an entering ceiling horizontal line 414 on the entering side of the wash chamber 218. The entering ceiling horizontal line 414 is in turn provided with water from the first and second lines 448 and 452 as described above. The entering ceiling detergent jets 334 are preferably spaced about 28 cm (11 in) apart.

This embodiment also has three exiting outer vertical lines 420 on the exiting outer side of the wash chamber 218, with each exiting outer vertical line 420 having four water jets for a total of 12 exiting outer detergent jets 336, and two exiting inner vertical lines 421 on the exiting inner side, with each exiting inner vertical lines 421 having four water jets for a total of eight exiting inner detergent jets 338. Water is supplied to the exiting outer and inner detergent jets, 336 and 338, respectively, through a series of exiting ceiling lines 423 connected by a connecting ceiling line 419 running perpendicular to the exiting ceiling lines 423. The exiting ceiling lines 423 are provided with water from the central horizontal line 418, which in turn is fed by the water flowing in the first and second lines 448 and 452. Although not shown, there can also be suitably-located ceiling detergent jets on the exiting ceiling lines 423.

This embodiment further has two (2) outer vertical rinse lines 424 and two (2) inner vertical rinse lines 425, with four (4) jets on each line as well as a rinse ceiling line 426 having two (2) jets for a total of eighteen rinse jets 340. The outer and inner vertical rinse lines, 424 and 425, as well as the rinse ceiling line 426 are provided with water through the rinse-disinfect line 422B which is one branch of the main water line 422 as described above. This embodiment further has a total of one (1) outer vertical disinfect line 427 and one (1) inner vertical disinfect lines 428 with four (4) jets on each line as well as a disinfect ceiling line 430 having two jets, for a total of ten (10) disinfect jets 342. The outer and inner vertical disinfect lines 427 and 428, as well as the disinfect ceiling line 430 are also provided with water via the rinse-disinfect line 422B. A water temperature indicator 432 can be placed in any of the above water lines, but is preferably placed in the entering ceiling horizontal line 414 on the entering side because this location provides a relatively accurate reading of the water temperature within the continuous washing system 110 and it is also within easy view of the operator.

Figure 4C:
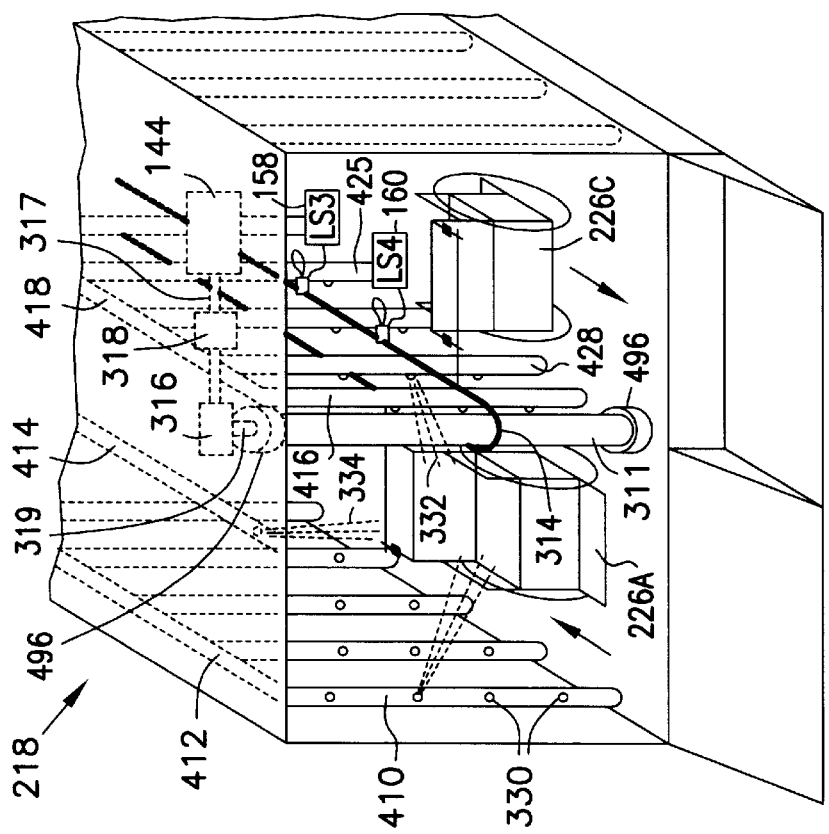
FIG. 4C is a simplified perspective view of the entrance and exit to a wash chamber in accordance with one embodiment of the present invention.

A perspective view of a portion of the wash chamber is shown in FIG. 4C in which object 226A has just entered the wash chamber 218 and is being sprayed with water containing detergent from a number of entering outer detergent jets 330, entering inner detergent jets 332 and entering ceiling detergent jets 334. For simplicity, water is shown coming out of only a few of the jets, but it should be understood that object 226A is being thoroughly wetted in three directions with the fan spray pattern of the pressurized water. Another object, 226C, is shown just after triggering the fourth limit switch (LS4) such that it is no longer receiving any spray. As shown in FIG. 4C, the entering inner detergent vertical lines 418 well as the exiting inner detergent lines 421 (not shown), the inner vertical rinse lines 425 and inner vertical disinfect line 428 can be located inside the drive chain 314, such that the drive chain 314 travels in an oblong path around these vertical lines as described above. Preferably there is a gap of sufficient size between the drive chain 314 and the inner vertical lines so that the drive chain 314 does not rub against the inner vertical lines, yet there is still adequate room within the wash chamber 218 for the objects 226 to travel in a curved path. In one embodiment there is a gap of about 2.5 cm (one [1] in) between the drive chain 314 and each of the aforementioned vertical lines. Furthermore, as shown in FIG. 4C, some of the various entering or exiting inner vertical lines can be used as a mount for each of the limit switches (LS1–LS4) (152, 154, 158, 160) at the desired location.

FIG. 4C also shows that the rotatable drive shaft 311 is connected to a suitable bearing system 496, such as flange bearings, so it can rotate freely as described in FIG. 3. The collar shaft 313 (not shown) is also connected to a suitable bearing system. FIG. 4C also shows the relative position of the right-angled gear box 316, the torque limiter 318 and the drive motor (DM) 144 which are connected by the first and second rotatable shafts, 317 and 319, described above.

Any suitable type of spray nozzle can be used for the various jets described above. Preferably the spray nozzles are made from a suitable material, are of a simple design, yet can also handle a suitable flow volume and create a suitable pattern. More preferably the spray nozzle is easily disconnected for service when necessary. In one embodiment, the various jets are brass, are comprised of a singular straight section, have a fixed angle of spray, such as about 45° or 90° on one end, and thread into threaded openings in their respective vertical supports at about a right angle on the other end. In an alternative embodiment, the angle of spray of the spray nozzles is adjustable, similar to an adjustable nozzle on a garden hose. In another alternative embodiment, the water jets are comprised of more than one straight portion which are connected at various angles. In another alternative embodiment, the water jets can be arranged on their respective vertical lines at various angles, either in an upwardly or downwardly direction depending on the type and size of object 226 being washed. In yet another alternative embodiment, the water jets are movable as they spray, such as in a circular manner.

Although any suitable pressure can be used, the water preferably exits the various water jets at a pressure which is relatively low so as not to cause damage to the objects 226, yet not so low as to cause the objects 226 to be inadequately cleaned. Preferably, the pressure is about 50 psi to about 1000 psi. More preferably the pressure is about 60 psi to about 150 psi. In one embodiment, the pressure is about 100 psi such that the water has enough force to exit the water jets in a "sunburst" or "fan" spray pattern, yet is low enough so as to not cause damage to wheel bearings or fabrics and upholestry on the objects 226.

In one embodiment, over 100 total water jets are used to provide water and chemicals in a fan spray pattern ranging from about 45 to 90 degrees, depending on their location vertically, to provide adequate coverage so that the objects 226 are preferably receiving a nearly vertical line of spray from top to bottom. It is to be understood by those skilled in the art that various other spray patterns can be used such as a conical spray pattern, and so forth.

Figure 5:
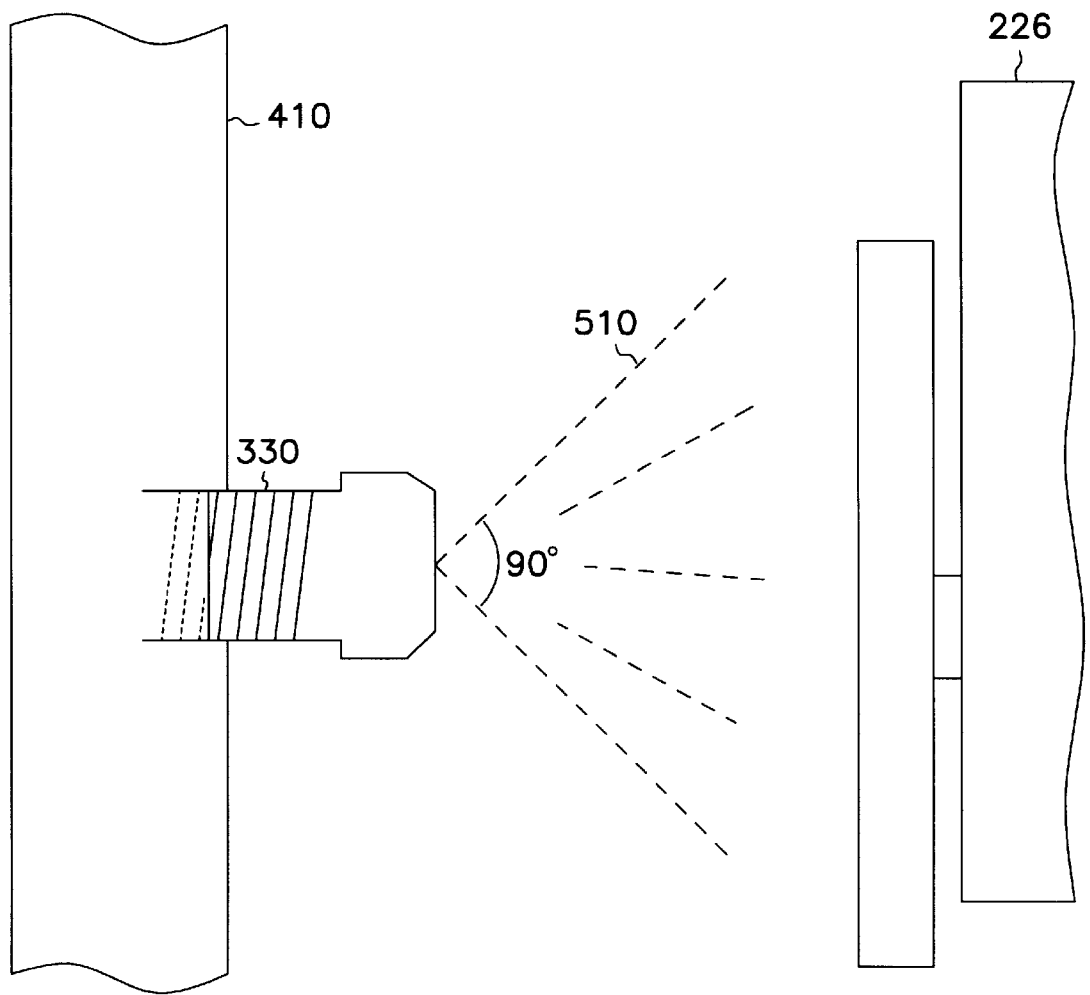
FIG. 5 is a simplified side view of a water jet and its resulting spray in accordance with one embodiment of the present invention.

FIG. 5 shows one embodiment of an entering outer detergent jet 330 having a fan spray pattern 510 of about 90°, which is threaded in place onto an outer vertical line 410. This type of water jet, i.e. a water jet having a 90° angle of spray, is preferably placed at about the mid-point of its respective vertical support to help maximize the coverage on each object 226 as noted above. In contrast, a water jet having an angle of spray of about 45° is preferably placed either at the lower or upper end of its respective vertical support, and tightened to the point such that the spray is directed at either an upwardly or downwardly angle depending on its vertical location, so that coverage on each object 226 is maximized.

Flow Paths for Filling, Cleaning and Draining Operations

Referring to FIGS. 6, 7, and 8, schematic diagrams of one embodiment of the present invention is shown wherein the continuous washing system 110 has the system controller 114 in place as well as a number of limit switches (LS1–LS4) for controlling various valve positions to permit different flow paths in the system unit 116 as discussed with FIG. 1. As stated above, the communication between the system controller 114 and the system unit 116 is accomplished with any suitable interface, such as a suitable bus interface 115. The flow paths include a cold water fill or a hot water fill from the water source 434 to the water reservoir 126 as shown in FIG. 6. The flow paths also include various operational flow paths which occur during the cleaning phase of the operation, in which heated water flows from the water reservoir 126 to the detergent jets 330, 332, 334, 336 and 338 the rinse jets 340, and/or the disinfect jets 342 as shown in FIG. 7. The operational flow paths can also include a recycle path in which water from the water reservoir 126 is reheated and returned again to the reservoir, also shown in FIG. 7 as the path with the "hatched" lines. The operational flow paths can further include a drainage path in which excess water in the water reservoir 126 is automatically drained. The same drainage flow path can be used to empty the water reservoir 126 when the water is no longer usable. Another drainage flow path can be used to empty water from the system when the service operation is complete as shown in FIG. 8.

FIG. 6 shows an embodiment of the present invention at a time in which there is little or no water in the system, and it is desired to fill the water reservoir 126 with water. Typically, after checking that the appropriate valves are opened or closed, the operator initiates this step by activating the appropriate button or key on the system controller 114 for a hot fill. Alternatively, as shown in the dashed lines in FIG. 6, the operator can instead initiate a cold fill step by activating the appropriate button or key on the system controller 114 which in turn causes the third service valve (SV3) 134 in line 615 to open. In this way, water which is drawn from the water source 434 in the main water line 422 enters a cold fill line 615 and and is released directly into the water reservoir 126, without passing through the water heater 256. No other valves in the continuous washing system 110 need to be opened at this time. A cold fill can be used for light cleaning or for any reason in which cold water is suitable or preferred.

Returning again to the hot fill step, only the first service valve (SV1) 130 needs to be open during a hot water fill. All of the other valves, including the second and third service valves (SV2) 132 and (SV3) 134, respectively, can remain closed. However, even though it is not necessary that the first wash valve 450 in the first wash line 448 and second wash valve 454 in the second wash line 452 be open during the fill step, these valves can be opened at this time, if it is desired, in preparation for the cleaning cycle as described in FIG. 7. If these valves are open during the fill operation, some water will likely enter the first wash line 448 and second line 450 under line pressure, but will not exit the various detergent jets as there is not enough pressure in these lines to force the water out of the jets, since the first and second pumps (P1) 136 and (P2) 138 are off. First and second recirculation valves, 650 and 652, respectively, in the recirculation line 470 as well as a drainage valve 690 in the second drain line 480 should remain closed during the fill operation as shown. Otherwise, water will exit the water reservoir 126 prematurely, either returning to the water heater 256 through the recirculation line 470 or draining out of the system through the second drain line 480, neither of which is desirable during the fill operation.

Since there is no water in the water reservoir 126 at the beginning of this operation, when the continuous washing system 110 is activated (by activating the appropriate button as noted above), the low level indicator (L2) 124 in the water reservoir 126 will send a signal via the system controller 114 to the first service valve (SV1) 130 located in the reservoir line 422A to open. This action allows cold water from the water source 434 to be drawn into the water heater 256 through the main water line 422 using a conventional tube or hose of sufficient length and capacity under the available line pressure. This line pressure can vary from location to location, but is typically between about 30 psi to about 100 psi.

It will be understood by those skilled in the art that all of the lines in the continuous washing system 110 are made from materials which can be either flexible or rigid, depending on their location and use. Furthermore, all lines are of a suitable diameter for their intended purpose, but are preferably between about 1.3 cm (0.5 in) to about ten (10) cm (four [4] in). in diameter. It will also be appreciated by those skilled in the art that flexible lines can include hoses made from rubber, plastic or other suitable material, and rigid lines can be made from galvanized metal, stainless steel, copper, PVC or other suitable material.

Also, although not shown, it will be appreciated by those skilled in the art that such means for sensing temperatures, pressures and fluid flow rates, and transducing the same into proportional electrical signals for transmission to readout or control devices may be provided for in all of the principal fluid flow lines. Furthermore, means for sensing temperature, pressure and fluid flow rates in all of the fluid flow lines may also be accomplished by suitable manual means.

The main water line 422 preferably also contains a check valve 616 located prior to the water heater 256, to prevent the backflow of water towards the water source 434. Water can be drawn from any suitable water source 434, including the host facility for which the objects 226 are being cleaned, an on-board water storage tank, and so forth. In this way, a continuous supply of water can be provided for the continuous washing system 110.

The water heater 256 can be of any suitable size and type, and is powered by any appropriate power supply, including, but not limited to liquid propane or electricity. Preferably the water heater 256 is a continuous operating high recovery water heater which can heat large amounts of water in a relatively short period of time. In one embodiment the water heater 256 is a coil-type heater fueled by liquid propane which can heat water at a rate of about 38 L/min (ten [10] gal/min) or more. In another embodiment the water heater 256 is an ELM Aquastar Model No. 170 VP water heater 256 having a recovery of about 11 L/min (three [3] gal/min). The use of liquid propane is desirable because it is economical, portable and burns efficiently. As noted above, electric water heaters can also be used as long as there is an adequate power supply 112.

The water heater 256 is activated when an internal diaphragm, located in an internal water heater line connected to the main water line, senses water pressure, causing a gas valve within the water heater 256 to open. The gas valve, which is ignited by a pre-lit pilot light, draws propane gas through the water heater 256 to the internal radiator to heat the water.

The temperature of the water should be raised by the water heater 256 to a level that will adequately clean the objects 226. Preferably the temperature of the water is between about 16° C. (60° F.) and about 65° C. (150° F.) or higher. In one embodiment, the water heater 256 raises the water temperature to at least the temperature specified by the manufacturer of the various agents, including the detergent, rinse agent and disinfectant. In another embodiment, the water temperature is at a level which will provide maximum cleaning efficiency, such as between about 32° C. (90° F.) and about 50° C. (122° F.). Preferably, the water temperature is raised to about 49° C. (120° F.) so that each object 226 absorbs enough heat so that the object 226 can air dry nearly completely in about five (5) to ten (10) minutes if the only drying means 225 present is a towel for spot drying. Even in the presence of a more sophisticated drying means 225, such as the air curtain 240 (shown in FIGS. 2 and 9), it is preferable to keep the water temperature between about 32° C. (90° F.) and about 50° C. (122° F.) for maximum cleaning efficiency.

Although temperatures much higher than about 49° C. (120° F.) can be used, at some point the temperature can become high enough such that the water causes damage to fabrics on the objects 226, such as vinyl, polyester-based silicone, and so forth. Such high temperatures can also cause the grease on the wheel bearings to dissolve and promotes corrosion. Furthermore, higher temperatures can also pose a safety risk to the operator. Conversely, although temperatures below about 16° C. (60° F.) can be used, the objects 226 would not absorb much heat and consequently there would be little or no drying due to flash evaporation. If it is necessary to operate the continuous washing system 110 using lower water temperatures, however, particularly in cold weather, precautions such as additional heaters and/or insulation would be needed to avoid icing of the objects 226 as well as the continuous washing system 110 itself.

The water reservoir 126 continues to fill with heated water from the reservoir line 422A until the water level reaches the first high water level sensor (L1) 122, which sends a signal via the system controller 114 to the first service valve (SV1) 130 to close as shown in FIG. 7. The water reservoir 126 can be of any suitable size to hold an adequate supply of heated water for the operation. Such amounts can vary from about 113 L (about 30 gal) or less to more than 340 L (90 gal) or more. In one embodiment the water reservoir 126 is about 0.6 m (two [2] ft) long, about two (2) m (6.5 ft) wide and about 25 cm (ten [10] in) deep and holds about 227 L (60 gal) of water. In this way, adequate water is available to run the system for about three (3) hours and clean about 100–150 objects 226, depending on the type and condition of the objects 226. The water reservoir 126 can also serve as a transporting vessel if the operator is required to transport water to a site where there is no access to a water supply. In an alternative embodiment a much larger water reservoir 126 can be constructed which can hold as much as 400 L (106 gal) or more.

In one embodiment the water reservoir 126 also contains a filter 620 for filtering out food particles and other debris in the water prior to being reused. Use of a movable water reservoir cover 306 as described in FIG. 3, also provides easy access to the filter 620 when necessary, such as when the filter 620 needs to be cleaned or replaced. Any suitable filter media can be used, but the filter 620 is preferably one that can filter out contaminants and small debris such as sand or lint, as well as large debris such as food particles. In one embodiment the filter 620 is about 0.6 m (two [2] ft) square and comprises a coarse air filter media held in place with 16 gauge steel mesh along the perimeter and on both sides, similar to the filters used in commercial furnaces. In this embodiment the media is comprised of a flexible foam-like substance. The filter 620 can be located anywhere within the water reservoir 126, but is preferably located over a first pump intake 622 for the first pump (P1) 136 and a second pump intake 624 for the second pump (P2) 138. The filter 620 can be held in place by any suitable holding apparatus, such as with one or more weights. In an alternative embodiment, the filter 620 is comprised of a media and a separate mesh container which is permanently installed within the water reservoir 126 such that the media is held in place with the mesh container, i.e. cage. Preferably the cage has a hinged or removable lid so that the media can easily be accessed to be cleaned or replaced. In another alternative embodiment a cartridge filter can be used.

Prior to the beginning of the wash step as shown in FIG. 7, the operator can check to see if the appropriate valves are opened, if this has not already been done. Specifically, if not already opened, the first wash valve 450 in the first wash line 448 and second wash valve 454 in second wash line 452 should now be opened. The first and second recirculation valves 650 and 652, respectively, in the recirculation line 470 should also be opened at this time, while the drainage valve 690 in the second drain line 480 remains closed.

The operator then presses the appropriate button or keys on the system controller 114 to cause the first pump (P1) 136 and the second pump (P2) 138 to turn on. This causes heated water in the water reservoir 126 to exit through the first and second pump intakes, 622 and 624, respectively, and then pass through the first and second pumps (P1) 136 and (P2) 138. The first and second pumps (P1) 136 and (P2) 138 can be powered by any suitable power supply, such as with a gasoline motor or generator. The first and second pumps (P1) 136 and (P2) 138 are also preferably suitably-sized pumps for pumping water at a relatively high volume ranging from about 38 L/min (ten [10] gal/min) to about 113 L/min (30 gal/min) of water and at a relatively low pressure of about 100 psi. The pumps (P1) 136 and (P2) 138 are preferably also designed to handle some amount of debris which may not have been filtered out by the filter 620. In one embodiment, each pump (P1) 136 and (P2) 138 is similar to a dishwasher pump. In another embodiment each pump (P1) 136 and (P2) 138 has a horsepower of about one (1) HP to about ten (10) HP. In yet another embodiment each pump (P1) 136 and (P2) 138 is a General Electric one (1) HP pump continuous duty cycle 3,450 rpm pool pump, having a pump body of about a 3.8 cm (1.5 in) inlet and outlet, which can operate on either 115 or 230 volts and at five (5) or ten (10) amps.

The first and second pumps (P1) 136 and (P2) 138 can be placed in any suitable location within the trailer 210, but are preferably placed lower than the lowest water level within the wash chamber 218. In one embodiment the pumps (P1) 136 and (P2) 138 are placed lower than the lowest level of the water in the water reservoir 126 so that the water is gravity fed from the pump intakes 622 and 624 to the pumps (P1) 136 and (P2) 138, respectively. This placement is preferable because the risk of pump cavitation is reduced. In one embodiment the pumps (P1) 136 and (P2) 138 are located in the equipment area 222 (shown in FIG. 2), about 0.6 m (two [2] ft) from the hinged edge of the water reservoir cover 306. As noted above, location of the pumps (P1) 136 and (P2) 138 in the equipment area 222 also helps to reduce the noise within the wash chamber 218 and in the general vicinity of the continuous washing system 110.

The heated water exits the first pump (P1) 136 in the first wash line 448 and passes through the open first wash valve 450 which can be manually or automatically controlled. The heated water from the first pump (P1) in the first wash line 448 then preferably passes through the wash line flow regulator 465 which is used to adjust the flow of water in the first wash line 448. The wash line flow regulator 465 can be any suitable type of flow regulator, and can be manually or automatically operated. In this way, when the heated water passes by the detergent line 469, the appropriate amount of detergent from the detergent source 466 is drawn into the detergent line 469 through the metering mechanism 468. Typically, the detergent source 466 will be the same container in which the detergent is purchased, although any suitably-sized container can be used, as long as adequate detergent is provided for the desired period of time. Any suitable type of metering mechanism 468 can be used, such as an electronic timer, a manual valve through which the detergent is gravity fed, and so forth. In one embodiment, a venturi-type injector is used. In an alternative embodiment, the detergent is gravity-fed from the detergent source 466 using a solenoid valve which is controlled by the system controller 114 to open and release a predetermined amount of detergent into the detergent line 469 before closing. The detergent line 469 can be any suitable size and made from any suitable material. Preferably the detergent line 469 is flexible, such as a tubing line or hose. Any suitable type of detergent can be used, but preferably the detergent is one that is low foaming, does not tend to cause corrosion to metals, and is suitable for various fabrics, including vinyl and silicone-containing materials. An example of one type of detergent is a custom-formulated mixture from Central Iowa Distributing in Fort Dodge, Iowa.

The hot water in the first wash line 448 is flowing preferably at about 38 L/min (ten [10] gal/min) to about 113 L/min (30 gal/min) or higher. In one embodiment the hot water is flowing at about 64 L/min (20 gal/min) such that about 7.8 mL/min (0.13 oz/min) of detergent is drawn into the first wash line 448. In another embodiment, about 1.9 L (32 oz) of detergent is used for about every 200 objects which are cleaned. For a typical operation this translates into about 475 mL (eight [8] oz) of detergent used every hour. These amounts can vary, of course, depending on the type and condition of the objects.

In an alternative embodiment, an additional line can be provided from the water reservoir 126 to the first wash line 448 such that this additional line contains the wash line flow regulator 465, and also has the detergent from the detergent source 466 feeding into it through the metering mechanism 468. Such an embodiment can be necessary if the water heater 256 does not have the capability of providing an adequate amount of hot water when needed. A disadvantage of this design is that the used water is not reheated prior to being dispensed again into the various detergent jets.

Referring again to the second wash line 452, the heated water in this line exits the second pump (P2) 138 and passes through the open second wash valve 454 which can be manually or automatically controlled. At this point a portion of the heated water is drawn off into the recirculation line 470, passing through the open fist recirculation valve 650, and returned to the main water line 422 at a point just prior to the entrance to the water heater 256 to be reused again in the continuous washing system 110. Again, the check valve 616 in the main water line 422 is positioned just prior to the point in which the recirculation line 470 enters into the main water line 422 to prevent any backflow. The recycled water exits the water heater 256 in the recirculation line 470, passing through the open second recirculation valve 652 prior to entering the water reservoir 126.

The remaining heated water in the second wash line 452 preferably passes through the open second wash valve 454 which can be manually or automatically controlled, and then through a second in-line filter 636. Similarly, the heated water in the first wash line 448, which now contains detergent, preferably passes through a first in-line filter 634. These secondary in-line filters, 634 and 636, can be any suitable type of filters which can aid in preventing clogging of the various spray jets. In one embodiment both filters, 634 and 636, are constructed of a PVC material which houses a fine screen mesh made from a suitable material, such as stainless steel, for capture of small particles, similar to the filters used in agricultural spraying applications.

In the embodiment shown in FIG. 7, the first and second wash lines 448 and 452, respectively, are connected to each other via the first and second connecting lines 453A and 453B as shown. In this way, all of the detergent jets 330, 332, 334, 336 and 338 which are connected to the first and second wash lines 448 and 452, are all supplied with a mix of water and detergent. Prior to passing out to the various detergent jets 330, 332, 334, 336 and 338, the heated water containing detergent in both the first and second lines 448 and 452, preferably passes through a first low pressure switch (LP1) 140 and a second low pressure switch (LP2) 142, respectively, set to activate the appropriate indicator on the system controller 114 when the pressure is below a predetermined value and to turn off the indicator when the pressure is above a higher predetermined value. Specifically, if the water pressure is below the predetermined value, an indicator light on the system controller 114 will light up, or an alarm will sound, warning the operator that the pressure is inadequate in either the first pump (P1) 136 or the second pump (P2) 138, or both, so that the operator can turn off the affected pump and take remedial measures. Such remedial measures can include adding additional water to the water reservoir 126 so that there is sufficient water to flow through the pumps (P1) 136 and (P2) 138, or adjusting the pitch of the trailer 210 itself so that sufficient water is running off from the various water jets into the water reservoir 126. In one embodiment, the first and second low pressure switches (LP1) 140 and (LP2) 142 are set to be activated at a pressure of about 30 psi and to be deactivated at a pressure of about 50 psi.

In an alternative embodiment, flow meters are placed in suitable locations in the first and second wash lines 448 and 452 to detect if adequate water is flowing through the first and second pumps (P1) 136 and (P2) 138. If the flow rate falls below a predetermined minimum rate or approaches zero (0), the system controller 114 can then send appropriate signals such as signaling the system unit 116 to enter into the hot fill phase or to automatically shut down by turning off the power supply 112.

At some point during the operation, the objects 226 each come into contact with the limit switches LS1, LS2, LS3 and LS4, previously described (see FIG. 3). When the first limit switch (LS1) 152 is contacted by an object 226, it signals the rinse valve (RV) 150 to open, causing heated water in the main water line 422 to be drawn from either the water heater 256 or a pressure tank 438 through the main water line 422, then through the rinse-disinfect line 422B into the rinse ceiling line 426, prior to passing through the rinse valve (RV) 150. The heated water then flows through a rinse line flow regulator 656 (similar to the wash line flow regulator 465) which is used to adjust the flow of water in the rinse ceiling line 426. In this way, when the heated water passes by the rinse line 658, the appropriate amount of rinse agent from the rinse agent source 660 is drawn into the rinse ceiling line 426 through a suitable metering mechanism 662. Typically, the rinse agent source 660 will be the same container in which the rinse agent is purchased, although any suitably sized container can be used as long as adequate rinse agent is provided for the desired period of time. Again, any suitable type of metering mechanism 662 can be used, such and line 658 can be any suitable type of line. Any suitable type of rinse agent can also be used, but preferably the rinse agent helps to remove detergent residue. In one embodiment the rinse agent is a water-based agent containing non-ionic wetting agents and dispensing aids such as propylene glycol and ethanol similar to the rinse aids used in dishwashers. Preferably the rinse agent also contains no phosphorous. An example of one type of rinse agent is Cascade® brand rinse agent. In one embodiment, the rinse agent also contains a rust inhibitor. In an alternative embodiment, no rinse agent or rust inhibitor of any type is used. In yet another alternative embodiment, only a rust inhibitor is used.

The hot water in rinse ceiling line 426 is flowing preferably at about 38 L/min (ten [10] gal/min) to about 113 L/min (30 gal/min) or higher. In one embodiment the hot water is flowing at about 64 L/min (20 gal/min) such that about 7.8 mL/min (0.13 oz/min) of rinse agent is drawn into the first wash line 448. In another embodiment, about 1.9 L (about 32 oz) of rinse agent is used for every 200 objects which are cleaned. For a typical operation this translates into about 475 mL (eight [8] oz) of rinse agent used every hour. These amounts can vary, of course, depending on the type and condition of the objects. At this point the heated water containing a suitable amount of rinse agent is dispensed through the rinse jets 340 onto the object 226 which has triggered this action.

When the object 226 hits the second limit switch (LS2) 154, the rinse valve (RV) 150 then closes so that the object 226 which triggered this action is no longer receiving spray from the rinse jets 340. When the object 226 hits the third limit switch (LS3) 158, the disinfect valve (DV) 156 opens, causing heated water in the main water line 422 to be drawn from the water heater 256 or the pressure tank 438 through the main water line 422, then through the rinse-disinfect line 422B, and then into the disinfect ceiling line 430 prior to passing through the disinfect valve (DV) 156. The heated water then flows through a flow regulator 664 (similar to the wash line flow regulator 465 and the rinse line flow regulator 656) which is used to adjust the flow of water in the disinfect ceiling line 430 such that when the heated water passes by line 666, the appropriate amount of disinfectant from the disinfectant source 668 is drawn into the disinfect ceiling line 430 through a suitable metering mechanism 670. Typically, the disinfectant source 668 will be the same container in which the disinfectant is purchased, although any suitably sized container can be used as long as adequate disinfectant is provided for the desired period of time. Again, any suitable type of metering mechanism 670 can be used and line 666 can be any suitable type of line. Any suitable type of disinfectant can be used, but preferably the disinfectant is one which thoroughly sanitizes the object 226 to remove most microbes. In one embodiment the disinfectant is a common household chlorine bleach such as Chlorox® brand bleach.

In one embodiment the hot water in the disinfect ceiling line 430 is flowing at about 64 L/min (20 gal/min) such that about 7.8 mL/min (0.13 oz/min) of disinfectant is drawn into the first wash line 448. In another embodiment, about 1.9 L (about 32 oz) of disinfectant is used for every 200 objects which are cleaned. For a typical operation this translates into about 475 mL (eight [8] oz) of disinfectant used every hour. These amounts can vary, of course, depending on the type and condition of the objects. At this point the heated water in the disinfect ceiling line 430 containing a suitable amount of disinfectant is dispensed through the disinfect jets 342 onto the object 226 which has triggered this action.

In an alternative embodiment, all necessary cleaning agents are contained in one mix such that the objects 226 receive the detergent, rinse agent and disinfectant through all of the various water jets throughout the wash chamber 218. In another alternative embodiment, only a detergent and disinfectant are used. In yet another alternative embodiments, one or more of the cleaning agents are contained in a solid form which is dispersed through the continuous washing system 110 by a suitable dispersing mechanism.

A pressure (or surge) tank 438 noted above is preferably used to store extra fresh hot water. In one embodiment, sufficient water is running into the water reservoir 126 and being recirculated back into the various water jets such that the first service valve (SV1) 130 remains closed. In this preferred operation, excess fresh hot water exiting the water heater 256 is forced into the bladder contained within the pressure tank 438 under line level pressure. The pressure tank 438 is preferably equipped with all necessary safety devices. In one embodiment the pressure tank 438 has a total volume of about 53 L (14 gal), and is pre-charged to a pressure of about 28 psi with a maximum pressure of about 100 psi. When the rinse valve (RV) 150 or the disinfect valve (DV) 156 are opened as described above, if water is present in the pressure tank 438, water will be drawn from that pressure tank 438 rather than the water heater 256, since the water within the pressure tank 438 is at higher pressure. If two pressure tanks 438 are used in series, water can be drawn out simultaneously from both pressure tanks 438. This action happens automatically and is not necessarily noticeable by the operator unless the water entering the wash chamber 218 through the various jets is at a slightly higher pressure, which would increase the sound of the water exiting the various jets.

The run-off from each of the water jets returns to the water reservoir 126 as described above, to be used repeatedly. In this way the water is recycled for further use which reduces heating and chemical costs. However, with the additional hot water continuing to run-off from the various water jets, and being recycled to the water reservoir 126, the water level in the water reservoir 126 eventually exceeds the first high water level sensor (L1), and reaches the second high water level sensor (L3) 125, which sends a signal to the system controller 114 to open the second service valve (SV2) 132 to begin an automatic drain step. In this way, water does not overfill the water reservoir 126, and can be continuously flushed from the system through the first and second drain lines 471 and 480 while the cleaning operation is ongoing. Water continues to exit through the first and second drain lines 471 and 480 until the water level in the water reservoir 126 reaches the low water level sensor (L2) 124, which sends the appropriate signal to the system controller 114 to close the second service valve (SV2) 132. In an alternative embodiment, a drain tube is used for the overflow and no second high level sensor (L3) 125 is used. The excess water can exit the system through a suitable drain such that it is released to the outside as runoff or into a public sewer system.

Alternatively, the draining phase of the operation can be initiated when the operator visually determines that the water is no longer usable and initiates a draining cycle. Depending on the condition of the objects 226 which were washed, this can happen anywhere from about 0.5 hours to about three (3) hours after initiating the operation. In an alternative embodiment, various properties of the water in the water reservoir can be monitored to determine when the water is no longer usable, such as the pH, amount and types of dissolved solids, turbidity level (i.e., the amount of suspended solids such as dirt and microbes, typically measured in nephelometric turbidity units [NTU]), and so forth. The draining is preferably accomplished by first allowing any remaining objects 226 in the wash chamber 218 to exit, and then pressing the appropriate button on the system controller 114 to open the second service valve (SV2) 132 in the first drain line 471 as shown in FIG. 8. i.e., the same service valve (SV2) 132 which opens automatically when the second high water level sensor (L3) 125 is reached. The first and second pumps, (P1) 136 and (P2) 138, respectively, can also be turned off at this time. In this way, water is drawn from the water reservoir 126 and pumped through the first drain line 471 into the second drain line 480 and exits the system.

The system can also be manually drained when desired, such as when a particular service operation is completed as shown in FIG. 8. During such a draining, the operator closes the first and second wash valves 450 and 454, which are the main valves through which water from the water reservoir 126 flows into the various detergent jets as discussed above. The first recirculation valve 650 and the drainage valve 690 can then be opened as well as a first manual drain valve 691, a valve which is located at a low point in the continuous washing system 110. In this way, water can flow through the first drain line 471 and a second drain line 480 to exit the trailer 210 (not shown). Second, third and fourth manual drain valves 692, 693 and 694 are also located at low points in the continuous washing system 110 and these valves can also be opened when attempting to drain the system. Preferably, these valves are routinely opened at the end of an operation when the weather is colder, as otherwise the water which is left in the various lines can freeze and cause damage to the system.

Drying Means

As discussed above, if the temperature of the water is suitably high, the objects 226 can dry fairly quickly due to flash evaporation. Preferably some other type of drying means 225 is also used to further dry the objects 226 such as an air curtain 240 as shown in FIG. 9A. The air curtain 240 creates a vertical wall of high velocity air over the open end of the wash chamber 218 to retain moisture within the wash chamber 218 and to act as a blow dryer for the exiting objects 226. Any suitable air flow speed can be used as long as the objects 226 are at least somewhat dried by the air, although in one embodiment the objects 226 are thoroughly dried before leaving the wash chamber 218. The blowers (B) 146 which create the air curtain 240 are preferably turned on from the system controller 114 or can be programmed to come on at the appropriate times. Although any type of blower (B) 146 can be used, preferably squirrel cage blowers are used because they are compact, efficient and are capable of moving large volumes of air. In one embodiment three blowers (B) 146 from Air Economy Corporation in Flemington, N.J. are used to create the air curtain 240 as shown in FIG. 9A. In this embodiment, warmed air from within the wash chamber 218 is drawn through one or more air intakes 919 and into one or more ducts or plenum chambers 920 by three blowers (B) 146.

FIG. 9A shows three blowers (B) 146: two blowers (B) 146 are connected to one end of a first plenum chamber 236 and the third blower (B) 146 is connected to one end of a second plenum chamber 237 such that air enters the other end of each of the plenum chambers 236 and 237 near the rear of the wash chamber 218, and exits in the operator area 220. The first and second plenum chambers 236 and 237 are preferably comprised of flexible ducting which can be arranged in any suitable manner. In the arrangement shown in FIG. 9A, there are generally right angles in the ducting between the entrance and exit so that a sufficient amount of ducting can be provided for in a relatively small space. Any suitable size, type and number of plenum chambers 236 and 237 can be used as long as adequate an adequate air curtain can be provided. In one embodiment, an insulated and flexible tube with an outer diameter of about 25 cm (ten [10] in) is used as the plenum chambers 236 and 237. The plenum chambers 236 and 237 preferably also pass through a condensate filter 922 which collects the moisture in the air and returns it to the wash chamber 218 through a suitable drain tube 924.

FIG. 9B shows a side view (from the exiting side of the wash chamber 218) of the air curtain 240 in which warm air is drawn up from within the wash chamber 218 and exits near the opening 224 as shown. In an alternative embodiment, air can be drawn from outside the wash chamber 218.

The air curtain 240 is preferable to other methods of retaining moisture and heat within the wash chamber 218 because it does not create any visual blocking of the wash chamber 218 itself. In an alternative embodiment one or more exhaust fans can be used to create the air curtain 240. In another alternative embodiment, a curtain, such as a vinyl curtain can be located at both the entrance and exit of the wash chamber 218. Any suitable type of vinyl curtain can be used, including one which is comprised of a number of strips of about five (5) cm (two [2] in) to about 15 cm (six [6] in) in width which can be easily pushed aside by the objects 226 being cleaned. Although such a curtain will create a visual blocking of the wash chamber 218 as noted above, it also allows sufficient heat to stay within the wash chamber 218 so that during average ambient temperatures of about 0° C. (50° F.) to about 50° C. (80° F.), only spot drying with a towel is necessary to thoroughly dry the objects 226 in this alternative embodiment.

The invention will be further described by reference to the following example which is offered to further illustrate another embodiment of the present invention. It should be understood, however, that many variations and modifications may be made while remaining within the scope of the present invention.

EXAMPLE

In this particular operation wheelchairs from a nursing home were cleaned at night when the outside temperature was about 4.4° C. (40° F.). Because of the chilly air, a space heater was used in the operator area to aid in drying the objects. A vinyl curtain comprised of several vinyl strips was also employed at the entrance to the wash chamber to help in keeping some of the heat inside the wash chamber. Since these wheelchairs have been cleaned by the cleaning and sanitizing system of the present invention once before, each wheelchair already had a bar code label affixed to one of the vertical supports.

Figure 10:
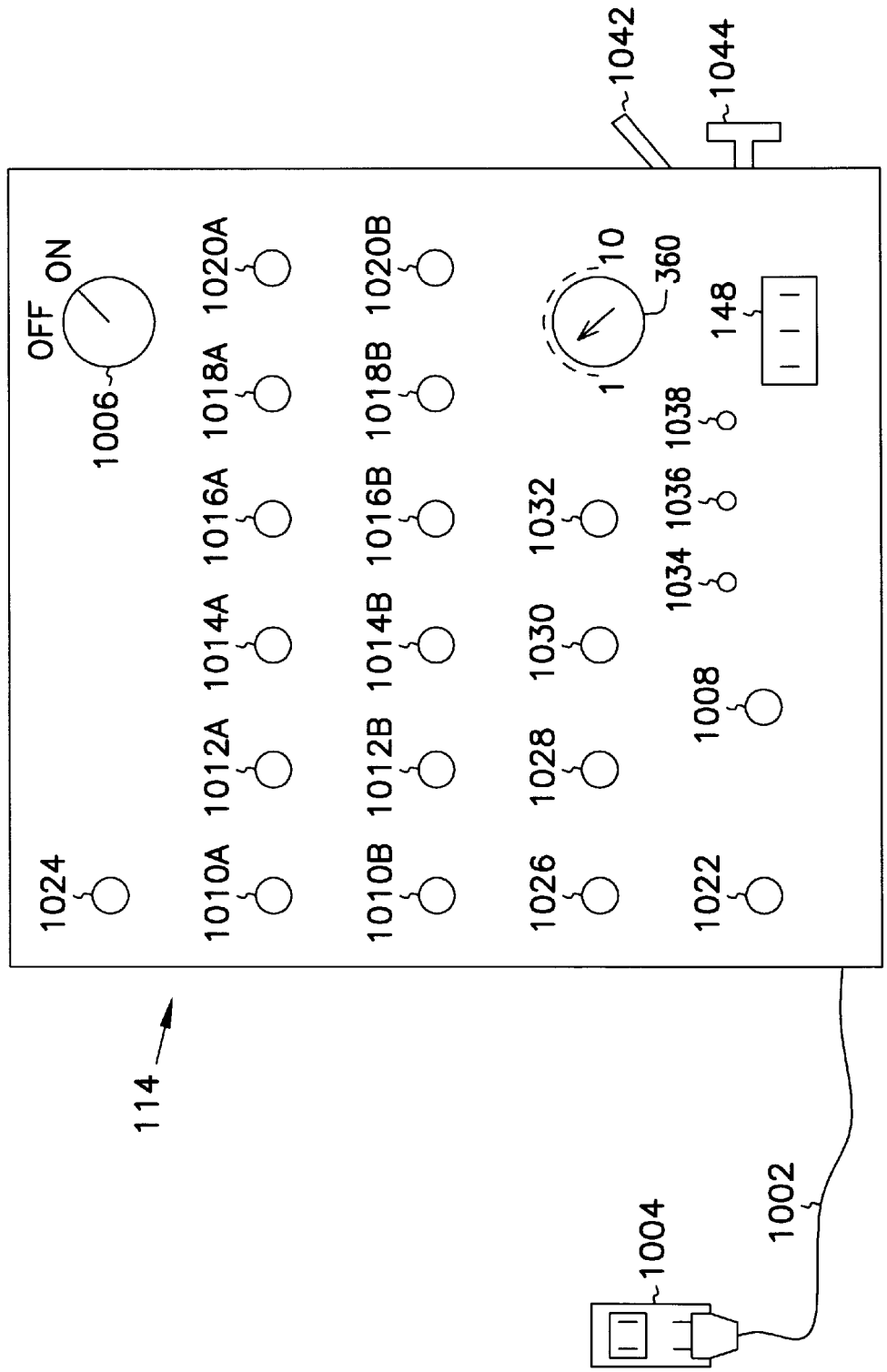
FIG. 10 is a simplified front view of a control panel in accordance with one embodiment of the present invention.

Referring to FIG. 10, the operator began by plugging in a power cord 1002 from a system controller (or a machine coupled to a control panel, hereinafter "control panel") 114 into a nearby socket 1004 which is wired to an on-board 220 volt Honda Model No. ES 6500 generator. The control panel 114 was about 0.6 m (24 in) square and was configured with various push buttons and indicator lights as shown. Alternatively, the operator could have plugged in the power cord 1002 into an alternative socket which would have allowed the cleaning and sanitizing system to share power at 220 volts from the nursing home. The operator then turned on the master on/off switch 1006 on the control panel 114 which provided power for interior lighting 1008 which he then turned on.

Other buttons on the control panel 114 used in this operation include green "on" buttons and red "off" buttons for various components. Specifically, there is a cold fill on-button 1010A and a cold fill off-button 1010B; a hot fill on-button 1012A and a hot fill off-button 1012B, a first pump (P1) 136 on-button 1014A, and a first pump (P1) 136 off-button 1014B; a second pump (P2) 138 on-button 1016A, and a second pump (P2) 138 off-button 1016B; a drive motor on-button 1018A and a drive motor off-button 1018B; and an air curtain on-button 1020A and an air curtain off-button 1020B. There is also a fill override button 1022 and an emergency stop button 1024.

Indicator lights on the control panel 114 include a full water reservoir light 1026 which activates when the first high water level sensor (L1) 122 in the wash chamber sends the appropriate signal and a low water reservoir light 1028 which activates when the low water level sensor (L2) 124 in the water reservoir sends the appropriate signal. (See also FIGS. 1, 6, 7, and 8). There is also a first low pressure indicator light 1030 for the first pump (P1) 136 and a second low pressure indicator light 1032 for the second pump (P2) 138 as described in FIGS. 6, 7 and 8. Other indicator lights include the rinse light 1034 which activates when an object 226 triggers the first limit switch (LS1) 152 and then goes off when the object 226 triggers the second limit switch (LS2) 154; the disinfect light 1036 which activates when an object 226 triggers the third limit switch (LS3) 158 and then goes off when the object 226 triggers the fourth limit switch (LS4) 160 as described in FIG. 3. In a continuous operation, each successive object 226 may trigger the "on" switches (LS1) and (LS3) often enough that the respective lights for rinse and disinfectant, 1034 and 1036, may stay on almost continuously or may flash off for only brief periods of time. The drain light 1038 activates when the second high water level sensor (L3) 125 sends the appropriate signal as discussed in FIGS. 1, 6, 7 and 8.

Other controls on the control panel 114 include the drive speed potentiometer, i.e., a variable speed drive motor control 360 as well as a generator start lever 1042 and a generator choke 1044 located on the side of the control panel 114 as shown in FIG. 10. The digital object counter (DOC) 148 which was initially set to zero was also used during this operation.

Since shopping carts had been cleaned just prior to this operation, the drive chain which is used to move the dirty objects through the wash chamber had shopping cart wash arms attached. The operator removed these wash arms and replaced them with wash arms suitable for use with wheelchairs. The operator placed about four (4) to six (6) wash arms along the drive chain, spacing them about one (1) m (three [3] ft) apart.

One end of a garden hose was attached to an external cold water supply of the nursing home and the other end was attached to the main water intake line on the exterior of the trailer. A gas valve on one of the two liquid propane tanks located outside the trailer was then opened to allow gas to flow to an ELM Aquastar hot water heater on the inside of the trailer. The operator then entered the equipment area to light the pilot light on the hot water heater and check to see that the vent to the outside was opened. The operator next opened the vent over the wash chamber area.

Several wheel chairs were brought outside and placed near the external ramp of the trailer. Three wheelchairs were then rolled up the external ramp to the operator area inside the trailer. It was apparent that one arm rest was in need of repair. The bar code of the first wheelchair was then scanned with an on-board scanner. The service record for this wheelchair appeared on a monitor located near the ceiling of the trailer, just outside the wash chamber. The display on the monitor indicated the owner's name, room number, the cleaning and repair record, the last of which included replacement of a seat back on the wheelchair. The operator took an arm rest from the appropriate bin and scanned the barcode on the bin once, causing a description of the parts and cost for each part to appear on the screen. This information was later printed out for billing purposes and for use by the administrator and maintenance manager in the nursing home. After the wheelchair was repaired, the scanning process was repeated for other wheelchairs.

Alternatively, some or all of the wheelchairs could have been brought to the trailer prior to any of the preliminary steps noted above, or even after the water reservoir inside the trailer was filled with hot water. By bringing out the wheelchairs first, however, the preliminary scanning and repair was done on the first wheelchairs at about the same time that the water reservoir was filling, so that the operation was efficiently managed.

The operator initiated filling of the water reservoir by pushing the hot fill on-button 1012A on the control panel 114 to begin a hot fill. This action caused the first solenoid valve (SV1) located in a branch of the main water line to open so that water was drawn through the hose from the nursing home and into the water heater. This flow of water in turn caused a diaphragm on an internal gas valve in the water heater to sense the line level water pressure, and turn on the gas to a burner to heat the water.

After the water became heated it entered the water reservoir located below the wash chamber floor. The water reservoir continued to fill until it had about 227 L (60 gal) of water at which time the high water level sensor (L1) signaled the control panel to close the first solenoid valve (SV1). During this particular operation, it was decided that additional water should be added to the water reservoir to completely remove air from the lines. The operator pushed the fill override button 1022 on the control panel 114 at the same time as the cold fill-on button 1010A until about 38 L (ten [10] gal) were added, which took about two (2) to three (3) minutes. Alternatively, the operator could have pressed the fill override button 1022 at the same time as the hot fill on-button 1012A, but it was decided that additional hot water was not necessary because water was still in the supply lines from the last service call.

At this time, the operator pressed the the driving mean on-button 1018B, and set the variable speed drive motor control 1040 to about five (5) or 50% so that the wheelchairs traveled through the wash chamber at about 1.3 m/min. This speed was chosen because the wheelchairs did not appear to be excessively dirty, although there were a few dried-on food particles.

The operator then pressed the first pump (P1) 136 on-button 1014A and the second pump (P2) 138 on-button 1016A, which caused water to be drawn from the water reservoir and begin to be expelled through the various water jets at about 60 psi. Shortly after the first and second pumps began operating, the first low pressure indicator light 1030 for the first pump (P1) 136 came on. Since additional water had already been added to the water reservoir, it did not appear likely that low water level in the water reservoir could be the problem. The operator determined that it was likely the pitch of the wash chamber floor which was not adjusted properly such that the water was not returning to the water reservoir after exiting the jets. He corrected this by first turning off the pumps to prevent cavitation, i.e., by pressing the first pump (P1) 136 off-button 1041B and the second pump (P2) 138 off-button 1016B, and then using a dolly jack to lower the tongue of the trailer so that the pitch of the wash chamber floor increased from about five (5) degrees to about 15 degrees. After returning to the operator area, the operator restarted both the pumps by pressing the appropriate buttons (1014A and 1016A) and determined that the first low pressure indicator light 1030 for the first pump (P1) 136 had gone off.

The operator then pressed the air curtain on-button 1020A to start three squirrel blowers located above the wash chamber, which provided the curtain of air for the exiting wheelchairs. The operator could have started the blowers prior to starting the pumps or at any time prior to the time wheelchairs exit from the wash chamber.

The operator then backed the first wheel chair into the wash chamber and lined it up with a wash arm such that two magnets attached to the wash arm came into contact with the front of the vertical metal supports of the wheel chair.

As the wheelchair proceeded through the wash chamber it was sprayed with one-hundred and twelve (112) water jets from both sides and the top containing warm water and various additives. For approximately the first 15 feet of travel the wheel chair was sprayed by water jets containing detergent and warm water. This includes the entire length of the entering side of the wash chamber which is about 3.7 m (12 ft) long and contains about 66 jets, as well as during and after the time the wheel chair made a U-turn. On the exiting side of the wash chamber, the remaining 20 detergent jets sprayed onto the wheel chair. At this point each wheelchair hit a first limit switch (LS1) which caused a rinse valve (RV) to open so that water containing a rinse agent was sprayed onto the chair from both sides and from the top with a total of 10 jets. The rinse agent caused the water on the wheelchair to bead up and run off which reduced drying time. The rinse agent also contained a rust inhibitor. This action continued for about the next 1.5 m (five [5] ft) of travel at which time the wheelchair hit a second limit switch (LS2) which caused the rinse valve (RV) to close. Shortly after this point, the wheelchair hit a third limit switch (LS3) which caused a disinfect valve (DV) to open so that water containing a disinfectant was sprayed onto the chair from both sides and from the top with a total of 11 jets. This continued for about the next 1.5 m (five [5] ft) at which time the wheelchair hit a fourth limit switch (LS4) which caused the disinfect valve (DV) to close. The appropriate lights on the control panel 114 lit up so the operator knew what stages the operation was in when he looked at the control panel 114.

After this point, the first wheelchair began to dry on its own due to flash evaporation from having used warm water. The wheelchair then exited the wash chamber, passing under the high velocity air curtain which blew warmed air down at a sufficient speed so that any remaining water droplets were blown off.

During the operation, sufficient water was running into the water reservoir and being recirculated back into the water jets that the first solenoid valve (SV1) remained closed such that water from the water heater was forced into two pressure tank bladders under line level pressure. At about mid-point during the operation, the fresh heated water for the rinse jets and disinfect jets was coming from the pressure tanks rather than the water heater. A few times during the operation, a second service valve (SV2) opened automatically to drain excess water from the water reservoir. This action occurred whenever the second high water level sensor (L3), located near the top of the water reservoir, was activated.

Also, after the used water containing each of the chemicals: detergent, rinse agent, and disinfectant had run into the water reservoir and was recycled for use with the detergent jets, the wheelchairs passing through the wash chamber at that time were sprayed in the first 15 feet with water containing not only recycled detergent, but recycled rinse agent and recycled disinfectant agent. It was not noticeable which wheelchairs were cleaned with the recycled water and which were cleaned using the initial water from start-up. This process was repeated for each of the 80 wheelchairs washed during this operation. The system was then drained by pressing the appropriate buttons on the control panel 114 as described above and in FIG. 8.

The invention process is simpler, faster, and requires less labor as is required in conventional continuous washing systems. The present invention is unlike conventional cleaning methods for larger objects such as wheelchairs in which only one object is washed at a time. It is also unlike other methods which continuously clean objects because it not only can clean each object separately, but the novel design of the wash chamber allows the objects to travel in a curved path such that only one operator can be used, if desired, to load and unload the objects from the wash chamber. Depending on the dirtiness of the object, the cleaning system of the present invention can process on an hourly basis, as many as 30 to 50 objects, such as wheelchairs. By reheating and recycling wash water which has already been heated and used, the continuous wash system of the present invention is efficient in operation, and is able to conserve both energy and water.

The method and apparatus of the present invention has the further advantage of being able to provide its service at any time, including at night when the objects to be cleaned, such as wheelchairs, are likely to not be in use. The added feature in the preferred embodiment of applying a bar code to each object when it is first cleaned, and employing the use of a particular software package, allows the operator to computerize the cleaning and repair records of each user. Each part which is replaced can be provided in a bin having a bar code, such that the exact part number and cost of each part can be scanned in for a particular object. This way, the operator needs only scan the bar code on the object the next time, and all of the service information will be visible on a monitor which can be located in the operator area.

Although the present invention has been described in considerable detail with reference to certain preferred versions thereof, other versions are possible. For example, the wash chamber floor can be modified to include water heating elements, a conveyor system, water jets, air returns, and a moisture and water vapor recapture system. Another alternative version of the system includes operating with only one pump which draws in water from the water reservoir and pumps it past an intake line, thus drawing in detergent (or detergent and rinse aid, or detergent, rinse aid and disinfectant), and thereafter releasing the water which now contains detergent, to the detergent water jets as described herein. In such an embodiment, the pump being utilized would likely need to be of a higher capacity. Alternatively, two pumps can be used as described herein, with the second pump used to feed the rinse agent and disinfectant into the water line, rather than relying on line pressure. The release of the chemicals into the water can also be automated so that the proper dilution is achieved at the appropriate time after the operator initiates the cleaning cycle.

In another alternative embodiment, more than one water reservoir is used such that the run-off from the detergent jets enters a first reservoir, run-off from the rinse jets enters a separate second reservoir, and run-off from the disinfect jets enters a separate third reservoir. In this way, the wash chamber is compartmentalized into three distinct areas and the chemicals in the water from the various areas do not mix. Alternatively, the continuous system of the present invention can have only two compartments for detergent and disinfectant only.

Additionally, the system of the present invention can be designed to be permanently installed at a desired location such that there is a permanent source for water and power, and adequate drainage. In this way, the service is available on-site 24 hours a day, and also provides the advantages of compactness and reduced labor costs.

What is claimed is:

1. A process for cleaning an object with a continuous wash system comprising the steps of:
   providing an apparatus for cleaning the object, the apparatus having a wash chamber with a floor and an opening;
   moving the object through the wash chamber, wherein the object travels in a relatively horizontal curved path, further wherein the object enters and exits the wash chamber through said opening;
   spraying water from a water source onto the object, wherein foreign materials are removed from the object; and
   draining water through one or more outlets in the floor while the object is in the wash chamber.

2. The process as recited in claim 1 wherein the relatively horizontal curved path is selected from the group consisting of a generally U-shaped path, a C-shaped path, and a J-shaped path.

3. The process as recited in claim 1 further wherein the continuous wash system is portable.

4. The process as recited in claim 1 wherein the water is sprayed with spraying means connected to the water source, further wherein at least some of the water from the water source is heated with a water heater connected to the spraying means.

5. The process as recited in claim 4 wherein a portion of the water is mixed with one or more cleaning agents.

6. The process as recited in claim 5 further wherein the object is sanitized with a disinfectant.

7. The process as recited in claim 6 further wherein the object is dried with drying means located proximate to the wash chamber.

8. The process as recited in claim 7 wherein the drying means comprises one or more plenum chambers and at least one blower which creates an air curtain proximate to the opening of the wash chamber.

9. The process as recited in claim 4 wherein a substantial amount of the foreign materials contained in the water is removed with at least one filter prior to using the water again in the wash system.

10. The process as recited in claim 9 wherein the at least one filter is located in the water reservoir.

11. The process as recited in claim 9 wherein the guiding means includes a closed loop drive chain onto which the object is connected using a wash arm.

12. The process as recited in claim 1 wherein guiding means cause the object to travel through the wash chamber in the relatively horizontal curved path.

13. The process as recited in claim 1 further comprising a water reservoir for holding water obtained from the water source which has not been sprayed and water which has been sprayed onto the object and has drained through the one or more outlets in the floor.

14. The process as recited in claim 13 wherein the floor is sloped towards one end of the wash chamber and the sprayed water drains by running down the sloped floor and into the water reservoir, further wherein the water reservoir is recessed beneath the floor.

15. The process as recited in claim 1 wherein the object has wheels and is selected from the group consisting of wheel chairs, shopping carts, food service carts, bakery racks, luggage carts, golf carts, bicycles and strollers.

16. A process for cleaning an object with a multi-component wash system comprising the steps of:
   providing an apparatus for cleaning the object, the apparatus having a wash chamber with a floor and an opening, the apparatus further having a source of mechanical energy proximate to the wash chamber for drawing water from a water source into an intake line and releasing the water through water jets located inside the wash chamber;
   guiding the object with guiding means along a relatively horizontal curved path inside the wash chamber, wherein the object enters and exits the wash chamber through said opening;
   draining water through one or more outlets in the floor while the object is in the wash chamber;
   placing an electronic sensing device in a location within the wash system for sensing at least one measurable process variable;
   receiving an input signal from the electronic sensing device in a machine, the input signal being representative of the measurable process variable; and
   opening a flow path within the wash system when the input signal is received by the machine.

17. An apparatus for cleaning an object comprising:
   a wash chamber with a floor and an opening, the wash chamber connected to a water source and a power supply
   a source of mechanical energy connected to the power supply for using water which has been drawn from the water source;
   at least one sprayer connected to the source of mechanical energy for spraying water onto the object as it travels through the wash chamber;
   one or more outlets in the floor for draining water while the object is in the wash chamber; and
   a relatively horizontal curved path inside the wash chamber along which the object travels, wherein the object enters and exits the wash chamber through said opening.

18. The apparatus as recited in claim 17 wherein the object has wheels and is selected from the group consisting of wheel chairs, shopping carts, food service carts, bakery racks, luggage carts, golf carts, bicycles and strollers.

19. The apparatus of claim 17 and further comprising:
   a water reservoir for holding water from the water source and from the at least one sprayer, the water reservoir located proximate to the wash chamber;
   a recirculator for recirculating water which has been sprayed on the object for further use in the wash system; and
   at least one filter located in the water reservoir to filter out a substantial amount of the foreign materials contained in the water which has been sprayed on the object, prior to using the water again in the wash system.

20. The apparatus of claim 19 wherein the relatively horizontal curved path is selected from the group consisting of a generally U-shaped path, a C-shaped path, and a J-shaped path.

21. The apparatus of claim 19 further wherein the wash system is portable.

22. The apparatus of claim 19 wherein at least some of the water is heated with a water heater connected to the at least one sprayer.

23. The apparatus of claim 19 further comprising:
   one or more cleaning agents mixed with a portion of the water for cleaning the object; and a disinfectant mixed with a portion of the water for disinfecting the object after it has been rinsed, wherein the object is sanitized.

24. The apparatus of claim 19 wherein guiding means cause the object to travel through the wash chamber in a curved path.

25. The apparatus as recited in claim 24 wherein the guiding means includes a closed loop drive chain onto which the object is connected using a wash arm.

26. The apparatus of claim 19 further comprising drying means located proximate to the wash chamber for drying the object which has been sanitized.

27. The apparatus of claim 26 wherein the drying means comprises one or more plenum chambers and at least one blower which creates an air curtain proximate to the opening of the wash chamber.

28. The apparatus as recited in claim 19 wherein the floor is sloped towards one end of the wash chamber and the sprayed water drains by running down the sloped floor and into the water reservoir, further wherein the water reservoir is recessed beneath the floor.

* * * * *

UNITED STATES PATENT AND TRADEMARK OFFICE
CERTIFICATE OF CORRECTION

PATENT NO. : 5,993,739
DATED : November 30, 1999
INVENTOR(S) : Larry R. Lyon

It is certified that error appears in the above-identified patent and that said Letters Patent is hereby corrected as shown below:

<u>Title page,</u>
Please delete all of line [73], i.e., "[73] Assignee: Chaircare, Waukee, Iowa"

Signed and Sealed this

Second Day of April, 2002

*Attest:*

JAMES E. ROGAN
*Attesting Officer*   *Director of the United States Patent and Trademark Office*